US008374842B2

(12) United States Patent  (10) Patent No.: US 8,374,842 B2
Amano et al.  (45) Date of Patent: Feb. 12, 2013

(54) DEVICE EMULATION SUPPORT APPARATUS, DEVICE EMULATION SUPPORT METHOD, DEVICE EMULATION SUPPORT CIRCUIT AND INFORMATION PROCESSOR

(75) Inventors: Katsushige Amano, Kyoto (JP); Tadao Tanikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 349 days.

(21) Appl. No.: 12/670,929

(22) PCT Filed: May 20, 2009

(86) PCT No.: PCT/JP2009/002221
§ 371 (c)(1),
(2), (4) Date: Jan. 27, 2010

(87) PCT Pub. No.: WO2009/144892
PCT Pub. Date: Dec. 3, 2009

(65) Prior Publication Data
US 2010/0204976 A1  Aug. 12, 2010

(30) Foreign Application Priority Data

May 28, 2008 (JP) .................................. 2008-139188

(51) Int. Cl.
*G06F 9/455* (2006.01)
(52) U.S. Cl. ........................................... 703/23; 703/24
(58) Field of Classification Search .................... 703/23, 703/24; 711/133, 204
See application file for complete search history.

(56) References Cited

U.S. PATENT DOCUMENTS 5,778,430 A * 7/1998 Ish et al. ....................... 711/133

5,809,560 A * 9/1998 Schneider ..................... 711/204

FOREIGN PATENT DOCUMENTS

| JP | 3-68037 | 3/1991 |
| JP | 6-348543 | 12/1994 |
| JP | 2001-209555 | 8/2001 |
| JP | 2004-252824 | 9/2004 |
| JP | 2006-113906 | 4/2006 |

OTHER PUBLICATIONS

M. Morris Mano, "Computer System Architecture," second edition, 1982, Prentice-Hall, pp. 428-434.*
International Search Report issued Aug. 25, 2009 in International (PCT) Application No. PCT/JP2009/002221.

* cited by examiner

*Primary Examiner* — Dwin M Craig
*Assistant Examiner* — Russ Guill
(74) *Attorney, Agent, or Firm* — Wenderoth, Lind & Ponack, L.L.P.

(57) ABSTRACT

An access monitoring section (11) obtains access information including an address conforming to an address stored in a monitoring address setting section (10) from an access signal output from a CPU (1) to a peripheral device (3). An access judging section (13) compares the access information received from the access monitoring section (11) and the last access information stored in an access storing section (12), and stores the obtained access information in the access storing section (12) and requests the transmission of an exception generation notification to an exception generating section (14) when the received access information is different from the last access information while excluding the last access information stored in the access storing section (12) from access information to be compared when the received access information is the same as the last access information. By this construction, throughput can be reduced at the time of emulation and the peripheral device can be efficiently emulated.

9 Claims, 15 Drawing Sheets

DEVICE EMULATION SUPPORT APPARATUS, DEVICE EMULATION SUPPORT METHOD, DEVICE EMULATION SUPPORT CIRCUIT AND INFORMATION PROCESSOR

TECHNOLOGICAL FIELD

The present invention relates to a device emulation support apparatus, a device emulation support method and a device emulation support circuit for facilitating the emulation of a peripheral device used by software during execution, and an information processor including such a device emulation support apparatus.

BACKGROUND ART

A program executed in an information processor operates while using one or more devices (peripheral devices) of the information processor. Thus, a program produced on the premise of a specific information processor does not normally operate if a device to be processed does not exist or a control method and/or specification differs even though the same type of device as the one to be process exists. In such cases, this program can be used in an information processor different from the specific information processor if the device to be processed can be emulated without changing the program.

Generally, control registers of devices are arranged in an address space of a central processing unit (CPU) and a targeted device operates through the operation of the control register by the CPU. In other words, the CPU writes or reads information to or from an address of the control register of the targeted device. Accordingly, upon emulating the device using software, access to a specific address, i.e. the address of the control register of the device to be emulated from the CPU needs to be trapped. The device to be emulated is a device which is to be processed by the software, but does not actually exist.

A general method for trapping an access to a specific address uses a protection function of a memory space. In other words, an exception is generated at the time of an access to a trapped address by prohibiting reading from and writing to this address. By starting emulation upon an exception handler and returning to an initial program after the completion of the emulation, the device can be emulated without changing this program.

There is also a bus monitoring device for detecting an access to a specific address space from a CPU by monitoring signals flowing on a bus (see, for example, patent literature 1). The bus monitoring device monitors various signals flowing on the bus and causes the CPU to interrupt if a signal conforming to a set condition is detected. Thus, an access to a specific address from the CPU can be trapped.

A device is emulated by letting software perform a process, which is supposed to be performed by the device to be emulated, instead of the device. In order to let the software perform the process instead, it is necessary to know the access, i.e. to obtain the content of the access after the access to a control register of the targeted device is trapped. For example, if a device to be emulated is a DMA (Direct Memory Access) and a process to be performed by the device is a memory copy, software for emulation obtains information necessary for the process such as an address of data to be copied in the memory. Hereinafter, the control register of the device to be emulated is referred to as a "virtual register".

In the case of an access to the virtual register for data writing, the software for emulation analyzes the content of a trapped command (write command) and specifies an arithmetic register holding data to be written. Further, the software for emulation obtains the data from the specified arithmetic register and writes the obtained data to the targeted address.

In the case of an access to the virtual register for data reading, the software for emulation analyzes the content of a trapped command (read command) and specifies the destination of the read data (arithmetic register, memory, or the like). Further, the software for emulation stores the read data in the destination.

However, in the conventional technology, the software for emulation analyzes the content of a trapped access and obtains necessary data every time an access to the control register is trapped. This means the execution of a plurality of commands and, hence, there has been a problem of increasing throughput.

PRIOR ART DOCUMENT

Patent Literature
Patent Literature 1:
Japanese Unexamined Patent Publication No. 2006-113906

SUMMARY OF THE INVENTION

The present invention was developed to solve the above problem and an object thereof is to provide a device emulation support apparatus, a device emulation support method, a device emulation support circuit and an information processor capable of reducing throughput at the time of emulation and efficiently emulating a peripheral device.

One aspect of the present invention is directed to a device emulation support apparatus communicably connected via a bus to a CPU for performing an emulation process by generating an exception, comprising a monitoring address storing section for storing an address corresponding to a peripheral device to be emulated as an address to be monitored; an access monitoring section for monitoring an access to the peripheral device from the CPU and obtaining access information including an address conforming to the address stored in the monitoring address storing section from an access signal including the access information with the address corresponding to the peripheral device to be accessed and output from the CPU to the peripheral device; an access storing section for storing the access information obtained by the access monitoring section; a read data storing section for temporarily storing data to be read from the peripheral device when the access is a read access indicating data reading; an exception generating section for transmitting an exception generation notification to the CPU to cause the CPU to generate an exception; an access judging section for receiving the access information obtained by the access monitoring section, comparing the received access information with the last access information stored in the access storing section and storing the obtained access information in the access storing section and requesting the exception generating section to transmit the exception generation notification to the CPU when the received access information is different from the last access information while excluding the last access information stored in the access storing section from access information to be compared when the received access information is the same as the last access information; and an access completing section for outputting the data stored in the read data storing section to the CPU and instructing the CPU to complete the read access when the access monitored by the access monitoring section is the read access while instructing the CPU to complete a write access indicating data writing when the access monitored by the access monitoring section is the write access.

According to this construction, the address corresponding to the peripheral device to be emulated is stored as the address to be monitored in the monitoring address storing section. The access to the peripheral device from the CPU is monitored, and the access information including the address conforming to the address stored in the monitoring address storing section is obtained from the access signal including the access information with the address corresponding to the peripheral device to be accessed and output from the CPU to the peripheral device. The obtained access information is stored in the access storing section. The data to be read from the peripheral device is temporarily stored in the read data storing section when the access is the read access indicating data reading. The obtained access information is received and the received access information and the last access information stored in the access storing section are compared. When the received access information is different from the last access information, the obtained access information is stored in the access storing section and the exception generation notification is transmitted to the CPU to cause the CPU to generate an exception. On the other hand, when the received access information is the same as the last access information, the last access information stored in the access storing section is excluded from the access information to be compared stored in the access storing section. When the access being monitored is the read access, the data stored in the read data storing section is output to the CPU and the CPU is instructed to complete the read access. Further, when the access being monitored is the write access indicating data writing, the CPU is instructed to complete the write access.

Specifically, when the received access information is different from the last access information stored in the access storing section, the emulation process is performed by causing the CPU to generate an exception. On the other hand, when the received access information is the same as the last access information stored in the access storing section, it is assumed as the re-execution of the access accompanying the completion of the exception. The CPU is instructed to complete the read access after specified data is output to the CPU when the access is the read access, whereas the CPU is instructed to directly complete the write access when the access is the write access.

According to the present invention, a process of obtaining necessary data by analyzing the content of the trapped access is not performed by the CPU that performs emulation. Thus, throughput can be reduced at the time of emulation and the peripheral device can be efficiently emulated.

The object, features and advantages of the present invention will become more apparent from the following detailed description and the accompanying drawings.

MODES FOR EMBODYING THE INVENTION

Hereinafter, embodiments of the present invention are described with reference to the drawings. The following embodiments are specific examples of the present invention and not of the nature to limit the technical scope of the present invention.

(First Embodiment)

Figure 1:
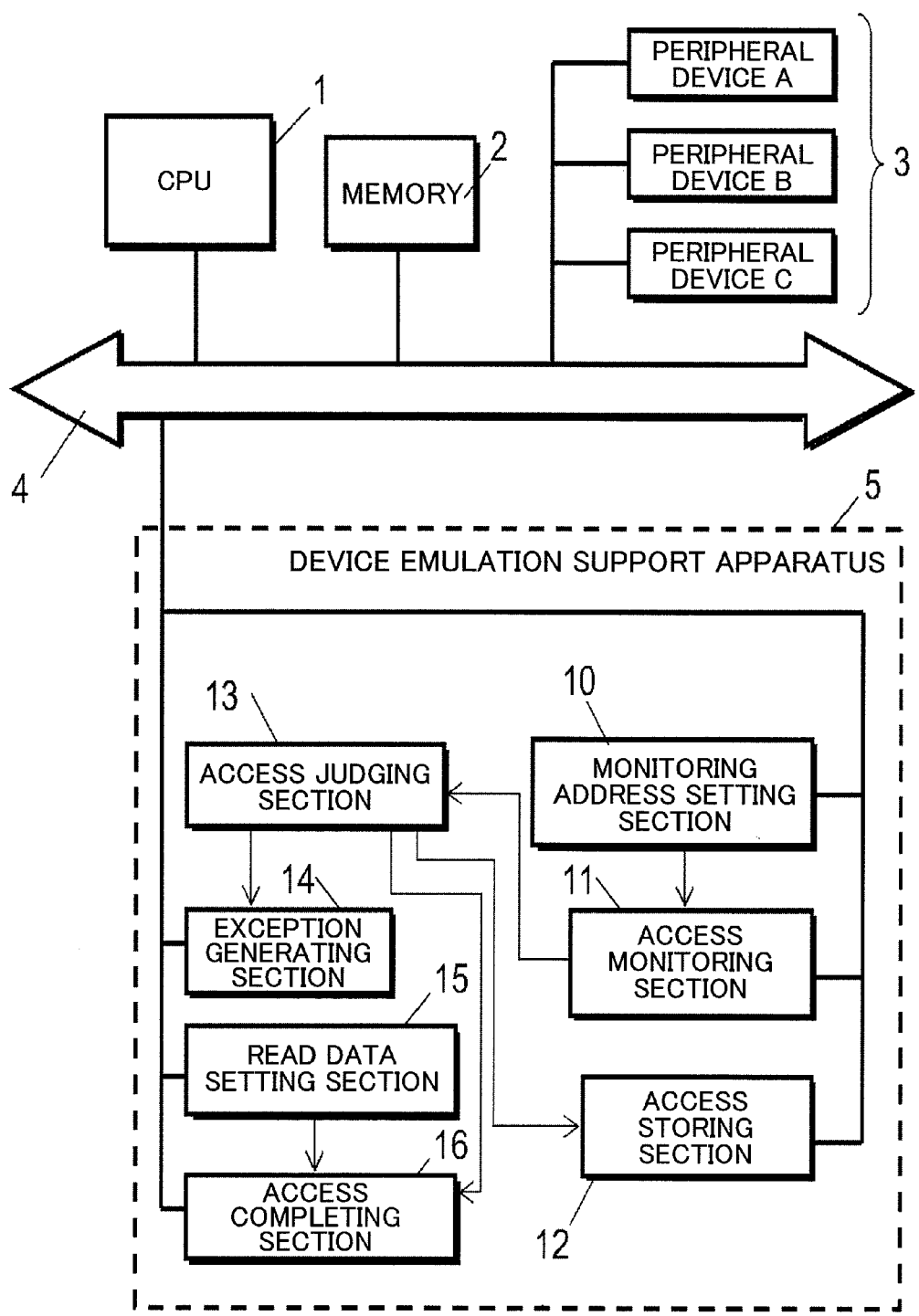
FIG. 1 is a diagram showing the construction of an information processor provided with a device emulation support apparatus according to a first embodiment of the invention.

FIG. 1 is a diagram showing the construction of an information processor provided with a device emulation support apparatus according to a first embodiment of the invention. The information processor is provided with a CPU (Central Processing Unit) 1, a memory 2, peripheral devices 3, a bus 4 and a device emulation support apparatus 5.

The CPU 1 controls the information processor by executing a program stored in the memory 2. An address space of the CPU 1 includes registers (control registers) necessary for the control of the peripheral devices 3. Upon controlling the peripheral device 3, the program executed by the CPU 1 reads or writes data from or to an address of the control register corresponding to the targeted peripheral device 3, thereby being able to control the peripheral device 3.

The memory 2 is a storage device for storing various programs executed by the information processor and data. Any one of arbitrary types of memories such as a random access memory (RAM) and a flash memory can be used as the memory 2. Alternatively, the memory 2 may be a combination of the same type of or different types of memories. Further, the memory 2 may include a read-only memory (ROM).

The peripheral devices 3 are devices such as various input/output units, and devices conforming to the intended use of the information processor are utilized. Here is shown an example including three peripheral devices, i.e. the peripheral device A, the peripheral device B and peripheral device C.

The bus 4 connects the CPU 1, the memory 2, the peripheral devices 3 and the device emulation support apparatus 5 in such a manner that they can communicate with each other and is a transmission channel for transmitting and receiving data. In other words, accesses to the peripheral devices 3 from the CPU 1 are made via the bus 4.

The device emulation support apparatus 5 monitors an access to the address space by the CPU 1 executing a guest program and causes the CPU 1 to perform an interrupt process. In this way, the device emulation support apparatus 5 notifies the access to the specific address to a program performing emulation (hereinafter, called an emulation program) to support the execution of the emulation program.

The guest program is a program for partly or entirely controlling a peripheral device whose existence is premised on the program, but not included in the information processor. The guest program includes a program for controlling the peripheral devices included in the information processor and a program for controlling peripheral devices not included in the information processor. The guest program may be comprised of only a program for controlling the peripheral devices not included in the information processor.

The guest program and the emulation program are stored in the memory 2 and executed by the CPU 1. In the case of executing the guest program by the CPU 1, the targeted emulation program is executed by trapping an access to a control register of a non-existent peripheral device. Thus, the non-existent peripheral device can be emulated by means of software.

The device emulation support apparatus 5 includes a monitoring address setting section 10, an access monitoring section 11, an access storing section 12, an access judging section 13, an exception generating section 14, a read data setting section 15 and an access completing section 16.

The monitoring address setting section 10 is a storing section for holding an address range to be monitored by the device emulation support apparatus 5. The device emulation support apparatus 5 traps accesses to the address range set by the monitoring address setting section 10. In other words, the monitoring address setting section 10 holds the address range corresponding to the peripheral device to be emulated. More specifically, the monitoring address setting section 10 is a control register for setting the range of addresses to be trapped similar to the control registers of the normal peripheral devices 3.

Values indicating the upper and lower limits of addresses are, for example, used as the address range set by the monitoring address setting section 10. Values indicating a start address and the size of the range may also be used as the address range set by the monitoring address setting section 10. The address range is set in the monitoring address setting section 10, for example, at the time of initializing the emulation program. Further, in order to designate the access to be trapped in a more detailed manner, the monitoring address setting section 10 may further set conditions other than the address range. For example, the monitoring address setting section 10 can set a read command or a write command or both of them as an access to be trapped.

The access monitoring section 11 monitors signals (access signals) flowing on the bus 4 and detects the generation of an access conforming to the conditions including the address range set in the monitoring address setting section 10. Each of these signals includes information (access information) on access content such as an address to be accessed, an access type indicating whether the access is a read access or a write access and the size of data to be read or written. Thus, the access monitoring section 11 can detect the access content of the access to the address space by the CPU 1 by monitoring the signals flowing on the bus 4. Further, the access monitoring section 11 notifies the detected access content conforming to the conditions to the access judging section 13.

The access storing section 12 holds the access content detected by the access monitoring section 11 and conforming to the conditions set in the monitoring address setting section 10. The access judging section 13 judges the access content notified from the access monitoring section 11 and stores it in the access storing section 12. The last access content conforming to the conditions set in the monitoring address setting section 10 is constantly held in the access storing section 12.

The access content to be stored in the access storing section 12 includes at least the address of an access destination, the access type indicating whether the access is a read access or a write access and a value (data) to be written in the case of a write access. The access content to be stored in the access storing section 12 may also include information indicating the size of data to be read or written. In order to make the last access content held in the access storing section 12 referable from the CPU 1, the address space of the CPU 1 includes a register capable of obtaining the last access content. The CPU 1 executing the emulation program refers to this access content and emulates the peripheral device.

The access judging section 13 receives the access content detected by the access monitoring section 11 and conforming to the conditions set in the monitoring address setting section 10 and judges whether or not the received access content is the same as the last access content stored in the access storing section 12 (access content trapped last time). The device emulation support apparatus 5 causes the CPU 1 to execute the emulation program upon the generation of an exception in the CPU 1. After the completion of an exception process, the CPU 1 returns to the command that generated the access to the peripheral device to be emulated and executes this command again. In other words, the access judging section 13 judges the re-execution of the command if the obtained access content is different from the last access content.

In the case of judging the re-execution of the command, the access judging section 13 stores the new access content in the access storing section 12 and requests the generation of an exception to the exception generating section 14. On the other hand, in the case where it is judged not to re-execute the command, i.e. the access content received this time is judged to be the same as the last access content, the access judging section 13 deletes the last access content stored in the access storing section 12 and notifies the access content to the access completing section 16. Thus, even if the received access content is the same as the stored last access content, the received access content is judged to be a new access thereafter.

Specifically, the access judging section 13 receives the access content obtained by the access monitoring section 11 and compares the received access content with the last access content stored in the access storing section 12. If the received access content differs form the last access content, the access judging section 13 stores the obtained access content in the access storing section 12 and requests the transmission of an exception generation notification to the exception generating section 14. On the other hand, if the received access content is the same as the last access content, the access judging section 13 excludes the last access content stored in the access storing section 12 from the access content to be compared.

Although the last access content is deleted in the first embodiment, it is not always necessary to delete the stored content itself. The deletion of the last access content means the exclusion from the access content to be compared by the access judging section 13.

The exception generating section 14 receives an exception generation request from the access judging section 13 and outputs an exception notification to the CPU 1 for the generation of an exception if the access content this time is judged to differ from the access content last time by the access judging section 13. Specifically, the exception generating section 14 outputs a specific signal capable of causing the CPU 1 to generate an exception such as data abort to the bus 4. Alternatively, the exception generating section 14 may be directly connected to a terminal of the CPU 1 relating to the exception generation, and the exception notification may be output from the exception generating section 14 to the CPU 1. Upon the generation of this exception, the CPU 1 operates the emulation program.

The read data setting section 15 temporarily holds data to be read from the peripheral device 3 if the trapped access was a read command. Data are set in the read data setting section 15 by the emulation program (CPU 1). In order to enable the CPU 1 to set data, the address space of the CPU 1 includes a register for setting data.

The access completing section 16 receives the access content notified from the access judging section 13 if the access content this time is judged to be the same as the last access content by the access judging section 13, i.e. the command is judged not to be re-executed. When the access type included in the access content notified from the access judging section 13 is a read access, i.e. when a read access is generated to let the guest program (CPU 1) read data from the control register of the non-existent peripheral device, the access completing section 16 completes the read access of the CPU 1.

Specifically, the access completing section 16 outputs the data stored in the read data setting section 15 to the CPU 1 and instructs the CPU 1 to complete the read access if the access monitored by the access monitoring section 11 is a read access. Further, the access completing section 16 instructs the CPU 1 to complete a write access if the access monitored by the access monitoring section 11 is a write access indicating data writing.

Specifically, the access completing section 16 obtains the data held in the read data setting section 15 and outputs it as a signal to the bus 4. In other words, the access completing section 16 causes the guest program to receive the data set by the emulation program as a result of the read access to the control register of the non-existent peripheral device.

On the other hand, when the access type included in the access content notified from the access judging section 13 is a write access, i.e. when a write access is generated to let the guest program (CPU 1) write data in the control register of the non-existent peripheral device, the access completing section 16 causes the CPU 1 to complete the write access. Specifically, the access completing section 16 outputs a data reception completion signal to the bus 4.

Figure 2:
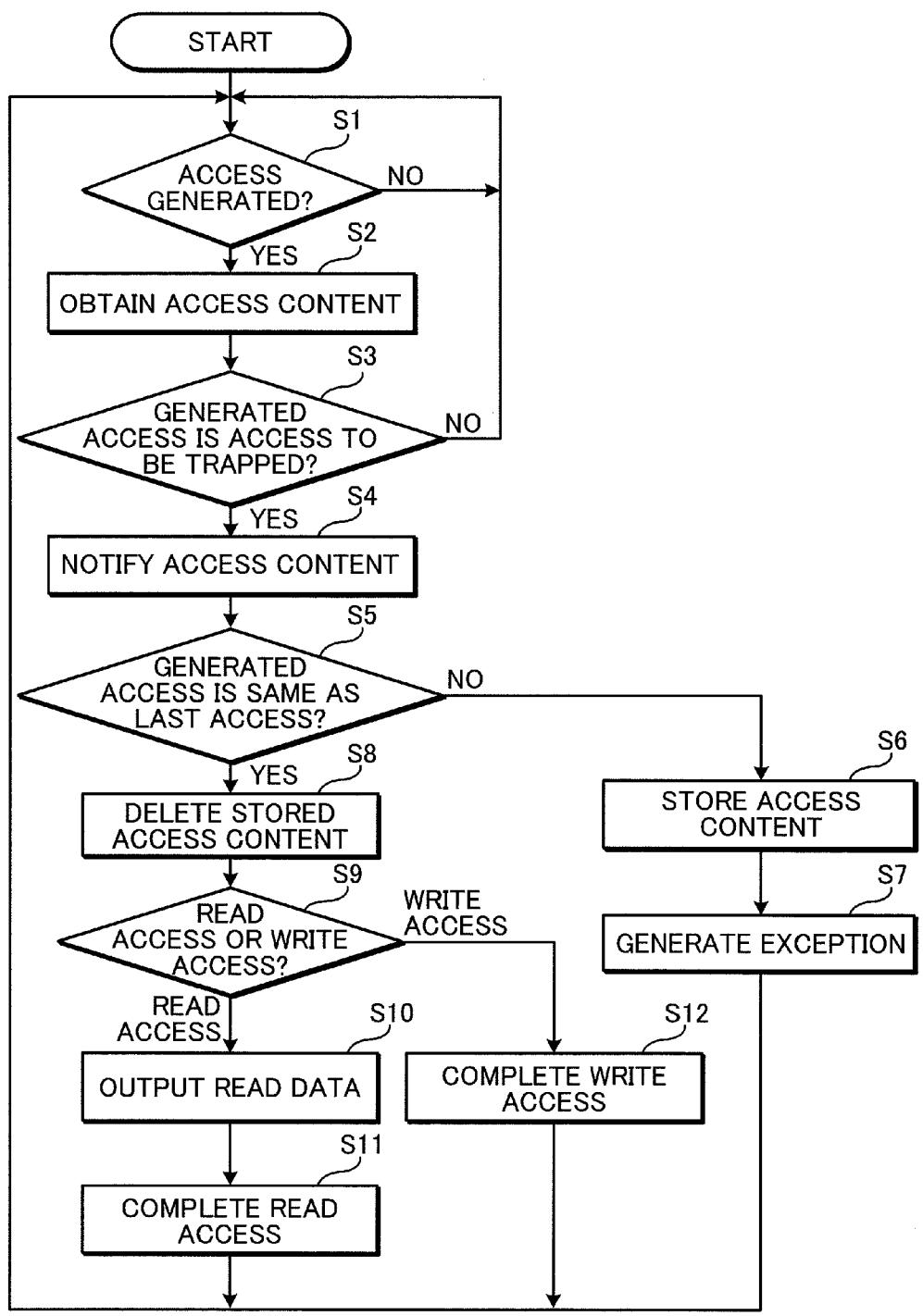
FIG. 2 is a flow chart showing the operation of the device emulation support apparatus according to the first embodiment of the invention.

FIG. 2 is a flow chart showing the operation of the device emulation support apparatus 5 during the execution of the guest program. First of all, the CPU 1 starts the operation of the guest program and the device emulation support apparatus 5 starts the process. The information processor provided with the device emulation support apparatus 5 may start the process of the device emulation support apparatus 5 by performing an initializing process at the time of start.

First, the access monitoring section 11 monitors signals flowing on the bus 4 and judges whether or not any access has been generated (Step S1). If no access has been generated (NO in Step S1), the access monitoring section 11 continues to monitor until an access is generated. If an access is generated (YES in Step S1), the access monitoring section 11 obtains an access content of the generated access (Step S2).

Subsequently, the address monitoring section 11 judges whether or not the generated access is the one to be trapped (Step S3). Specifically, the address monitoring section 11 detects the generation of the access with the conforming address (access to be trapped) by judging whether or not the address included in the obtained access content conforms to the range of addresses to be trapped set by the monitoring address setting section 10. If conditions other than the address range are set in the monitoring address setting section 10, the address monitoring section 11 also judges whether the access conforms to these conditions. If the generated access is not the one to be trapped (NO in Step S3), this routine returns to the processing in Step S1 to repeat the process.

On the other hand, if the generated access is the one to be trapped (YES in Step S3), the address monitoring section 11 notifies the access content of the generated access to the access judging section 13 (Step S4).

Subsequently, the access judging section 13 compares the access content notified from the address monitoring section 11 and the access content of the last access (access trapped last time) stored in the access storing section 12. In other words, the access judging section 13 judges whether or not the access generated this time is the same as the last access stored in the access storing section 12 (Step S5).

Although the access judging section 13 compares at least the address of the access destination, other information usable to judge whether or not the access results from the same command may be compared. In the case of a CPU including a command set which enables the designation of the size of data to be read or written, the data size may be used for judgment. In the case of an information processor capable of burst transfer, the use or non-use of the burst transfer and the transfer size may be used for judgment.

If the generated access is judged to be different from the last access (NO in Step S5), the access judging section 13 stores the access content of the new access as the access content of the last access in the access storing section 12 and outputs an exception generation request to the exception generating section 14 for the generation of an exception (Step S6). The exception generating section 14 receives the exception generation request output by the access judging section 13 and outputs an exception notification for the generation of an exception to the CPU 1 (Step S7).

On the other hand, if the generated access is judged to be the same as the last access (YES in Step S5), the access judging section 13 judges the re-execution of the command, deletes the access content of the last access stored in the access storing section 12 and notifies the access content of the new access to the access completing section 16 (Step S8).

Subsequently, the access completing section 16 judges whether the access content notified by the access judging section 13 indicates a read access for reading data from the memory or a write access for writing data in the memory (Step S9).

If the access content is judged to be the read access ("READ ACCESS in Step S9), the access completing section 16 obtains the read data held in the read data setting section 15 and outputs the obtained read data to the bus 4 (Step S10). Subsequently, the access completing section 16 completes the re-executed read access (Step S11) and this routine returns to the processing of Step S1. In this way, processings in Step S1 and subsequent Steps are repeatedly performed.

On the other hand, if the access content is judged to be the write access ("WRITE ACCESS" in Step S9), the access completing section 16 completes the re-executed write access (Step S12) and this routine returns to the processing of Step S1. In this way, processings in Step S1 and subsequent Steps are repeatedly performed.

When the guest program ends its operation, the device emulation support apparatus 5 finishes access monitoring to complete the process shown in FIG. 2. Further, the device emulation support apparatus 5 may continue to monitor accesses during the start-up of the information processor provided with the device emulation support apparatus 5.

Figure 3:
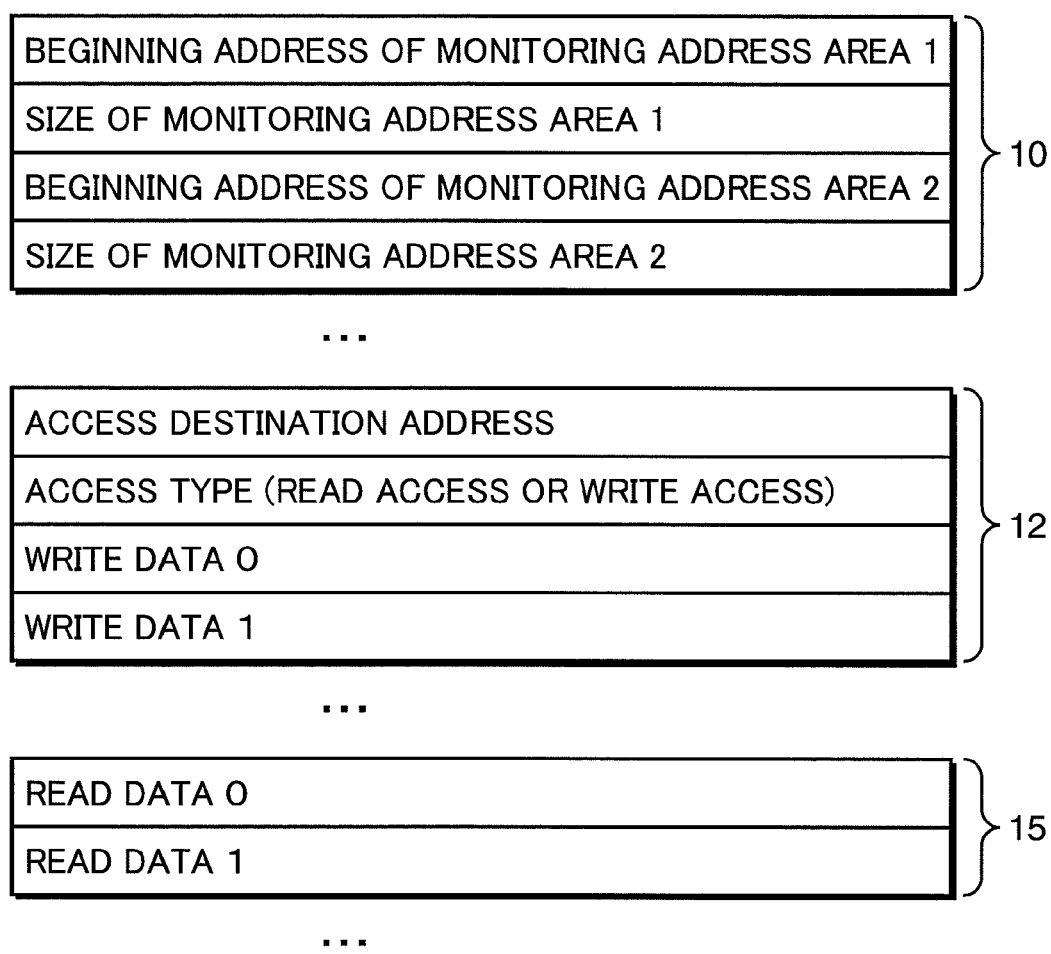
FIG. 3 is a diagram showing exemplary constructions of registers used in the device emulation support apparatus according to the first embodiment of the invention.

FIG. 3 is a diagram showing exemplary constructions of the registers used in the device emulation support apparatus 5 in the first embodiment of the present invention. As described above, in order to enable the process (reading process or writing process) by the CPU 1, a plurality of registers are arranged in the address space of the CPU 1.

The monitoring address setting section 10 is the register for setting the range of addresses to be trapped. As shown in FIG. 3, the monitoring address setting section 10 holds beginning addresses of monitoring address areas to be trapped and the sizes of the monitoring address areas in pairs. The monitoring address setting section 10 can hold a plurality of pairs.

The access storing section 12 is the register for storing the access content of the trapped access. The access storing section 12 holds the access content of the access being processed from the generation of the access to the end. As shown in FIG. 3, the access storing section 12 stores, as the access content, the address of the access destination, the access type indicating whether the access is a read access or a write access and a value (write data) to be written when the access type is the write access.

The read data setting section 15 is the register for setting data (read data) to be read by the CPU 1 when the trapped access is the read access.

The number of registers corresponding to the maximum size of the burst transfer are provided for the write data of the access storing section 12 and the read data of the read data setting section 15 in order to handle a burst reading process and a burst writing process by the CPU 1.

Figure 4:
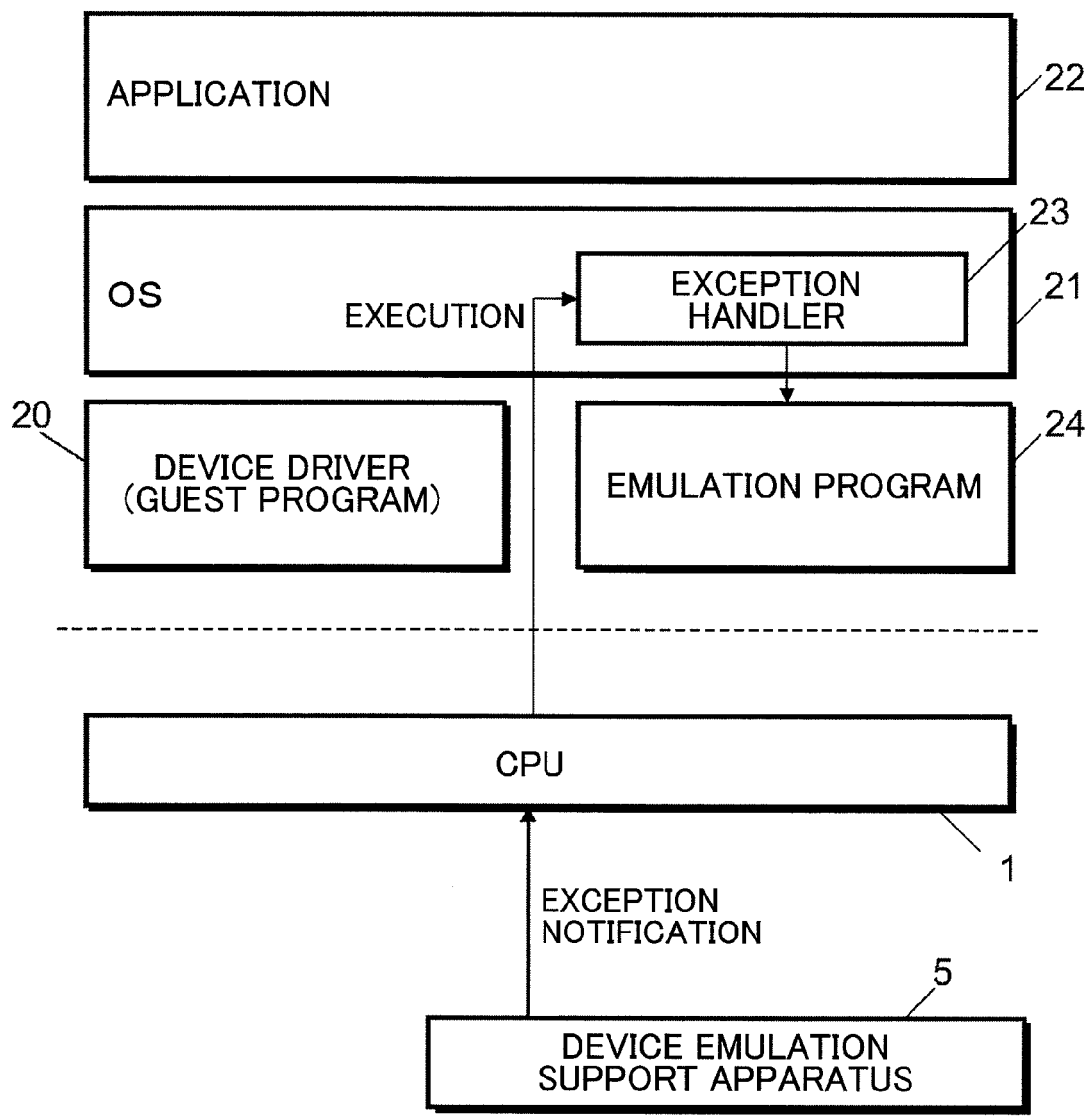
FIG. 4 is a diagram showing an exemplary software configuration of the information processor provided with the device emulation support apparatus according to the first embodiment of the invention.

FIG. 4 is a diagram showing an exemplary software configuration of the information processor provided with the device emulation support apparatus according to the first embodiment.

In FIG. 4, the information processor is assumed not to include a peripheral device corresponding to a device driver 20. In other words, the device driver 20 is a guest program and accesses to a non-existent peripheral device.

When an application 22 operating on the information processor generates an access to the peripheral device controlled by the device driver 20, the device emulation support apparatus 5 operates. The device emulation support apparatus 5 outputs an exception notification to the CPU 1, thereby causing the CPU 1 to generate an exception. An exception handler 23 in an OS 21 operates upon the receipt of the exception from the CPU 1. The exception handler 23 judges whether or not the exception is generated by the device emulation support apparatus 5 and operates an emulation program 24 in the case of the exception generated by the device emulation support apparatus 5.

The emulation program 24 obtains the access content from the access storing section 12 of the device emulation support apparatus 5, specifies the peripheral device to be emulated, and performs emulation corresponding to the specified peripheral device. In this way, the information processor can utilize the device driver 20 as the guest program as it is. Accordingly, the information processor can be operated without changing a dependence relationship with the device driver 20, for example, even if the application 22 depends on the specification of the device driver 20.

Figure 5:
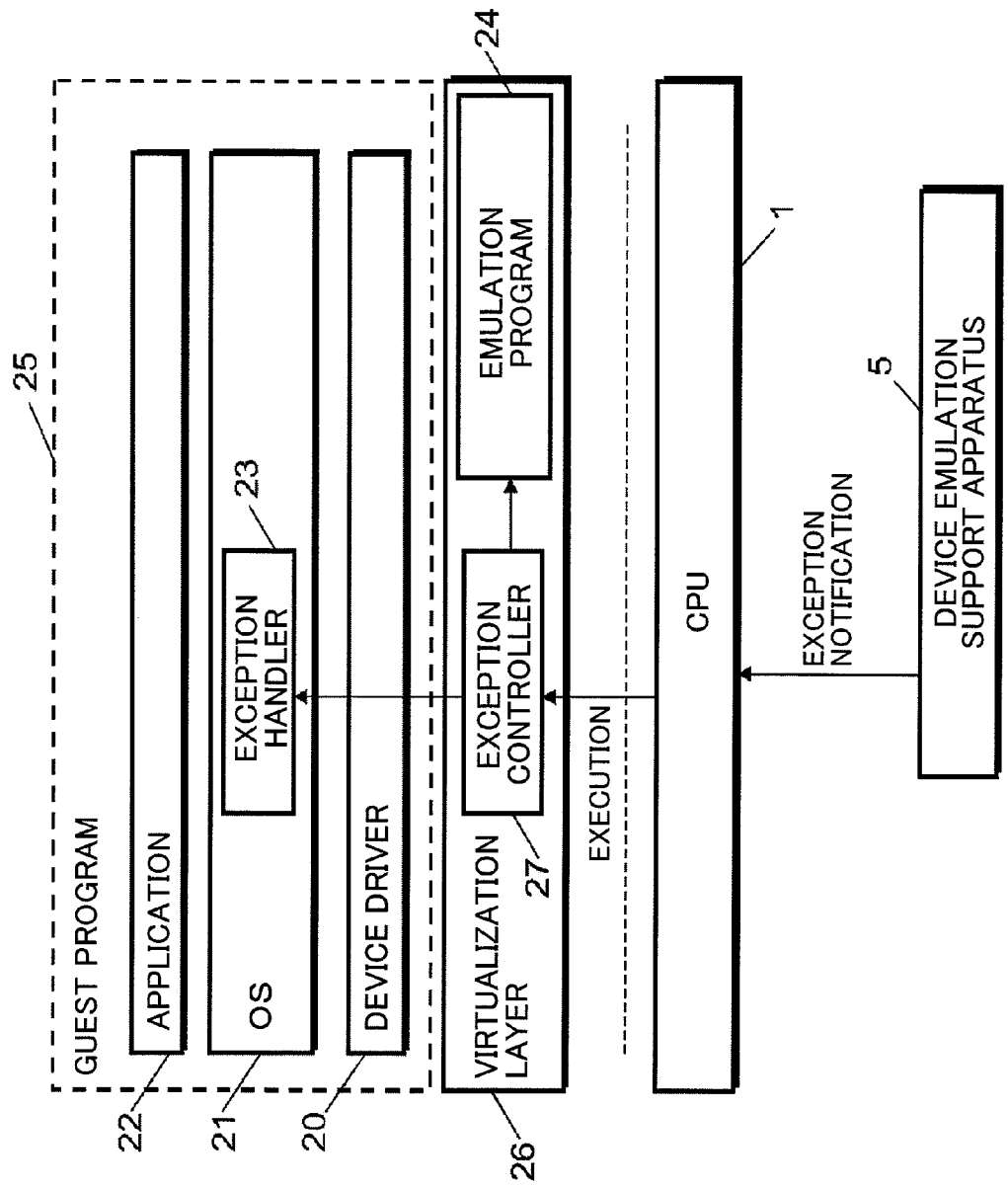
FIG. 5 is a diagram showing a first modification of the software configuration of the information processor provided with the device emulation support apparatus according to the first embodiment of the invention.

FIG. 5 is a diagram showing a first modification of the software configuration of the information processor provided with the device emulation support apparatus according to the first embodiment.

In FIG. 5, the information processor is assumed not to include the peripheral device corresponding to the device driver 20. A guest program 25 includes the device driver 20, the OS 21 and the application 22. In other words, the entire system of the software produced on the premise of hardware including different peripheral devices is a guest program. In FIG. 5, the information processor includes a virtualization layer 26 for controlling the emulation of the peripheral devices, and the virtualization layer 26 includes an exception controller 27.

When the application 22 operating on the information processor generates an access to the peripheral device controlled by the device driver 20, the device emulation support apparatus 5 outputs an exception notification to the CPU 1, thereby causing the CPU 1 to generate an exception. Upon receiving the exception notification, the CPU 1 instructs the exception controller 27 of the virtualization layer 26 to execute an exception process. The virtualization layer 26 first operates the exception controller 27 upon receiving the instruction to execute the exception process from the CPU 1.

The exception controller 27 judges whether or not the exception was generated by the device emulation support apparatus 5. In the case of the exception generated by the device emulation support apparatus 5, the exception controller 27 operates the emulation program 24. If the generated exception is not the one generated by the device emulation support apparatus 5, the exception controller 27 transfers a control to the exception handler 23 in the OS 21. In this way, the emulation program 24 operates when the device driver 20 in the guest program 25 accesses to the peripheral device.

Figure 6:
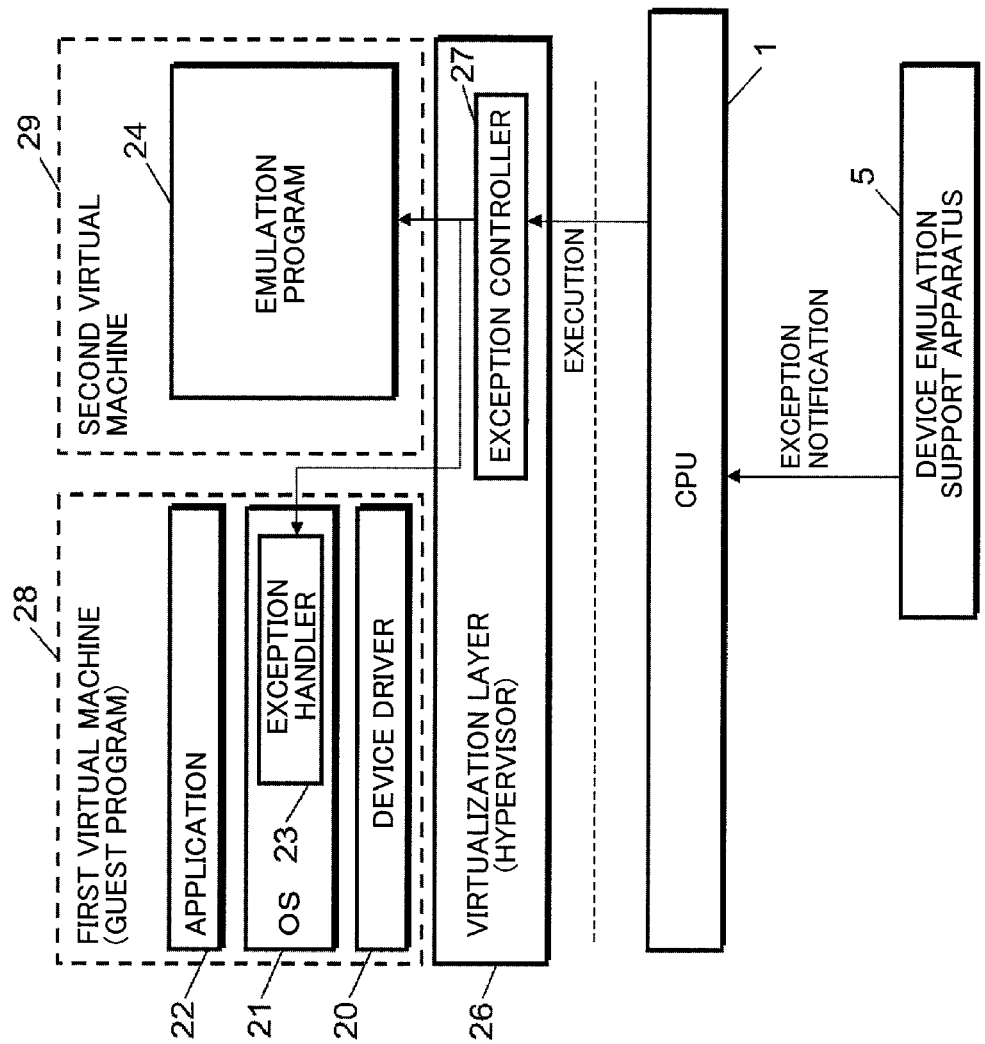
FIG. 6 is a diagram showing a second modification of the software configuration of the information processor provided with the device emulation support apparatus according to the first embodiment of the invention.

FIG. 6 is a diagram showing a second modification of the software configuration of the information processor provided with the device emulation support apparatus according to the first embodiment.

In FIG. 6, the information processor is assumed not to include the peripheral device corresponding to the device driver 20. Further, a virtualization layer 26 controls a plurality of virtual machines. This virtualization layer 26 is called a hypervisor and controls the execution of a plurality of virtual calculators (virtual machines) on one physical calculator. In FIG. 6, the information processor includes a first virtual machine 28 and a second virtual machine 29. The first virtual machine 28 operates as a guest program. The second virtual machine 29 executes the emulation program 24.

The virtualization layer 26 has a function of operating the second virtual machine 29 for executing the emulation program 24 and the first virtual machine 28 for executing the guest program 25 in a time sharing manner. Further, the virtualization layer 26 includes an exception controller 27.

When the application 22 operating on the information processor generates an access to the peripheral device controlled by the device driver 20, the device emulation support apparatus 5 outputs an exception notification to the CPU 1, thereby causing the CPU 1 to generate an exception. Upon receiving the exception notification, the CPU 1 instructs the exception controller 27 of the virtualization layer 26 to execute an exception process. The virtualization layer 26 first operates the exception controller 27 upon receiving the instruction to execute the exception process from the CPU 1.

The exception controller 27 judges whether or not the exception was generated by the device emulation support apparatus 5. In the case of the exception generated by the device emulation support apparatus 5, the exception controller 27 operates the emulation program 24. If the generated exception is not the one generated by the device emulation support apparatus 5, the exception controller 27 transfers a control to the exception handler 23 in the OS 21. In this way, the emulation program 24 operates when the device driver 20 in the guest program 25 accesses to the peripheral device.

Some of the peripheral devices operate in parallel with the CPU such as a DMA, a decode engine and an encode engine. In the case of emulating such a peripheral device, it is preferable to concurrently perform the execution of the guest program and the processing of data by the emulation of the peripheral device. In the case of using the software configuration shown in FIG. 6, it is possible to concurrently operate the guest program 25 and the emulation program 24 in a time sharing manner.

Figure 7:
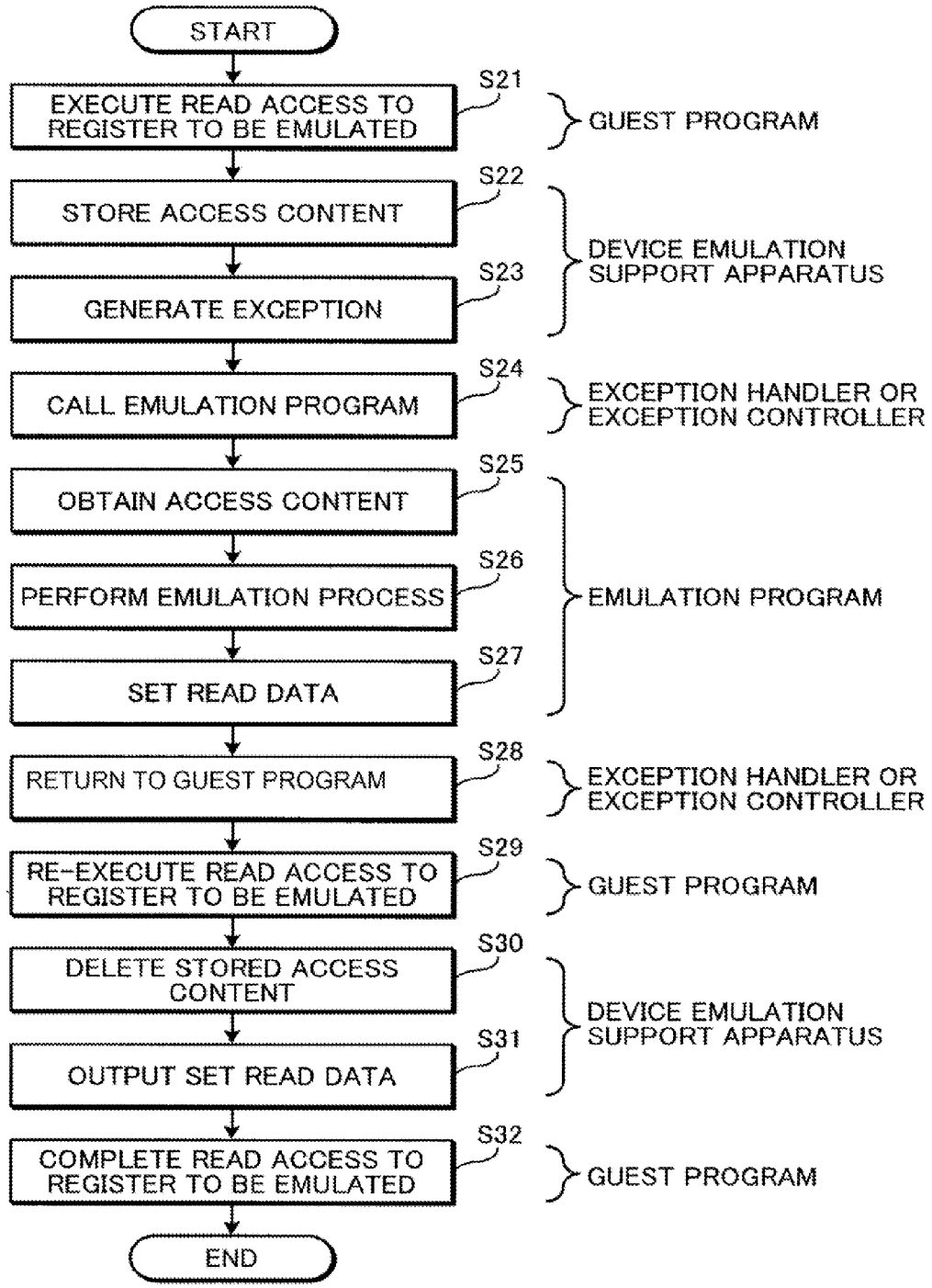
FIG. 7 is a flow chart showing an exemplary emulation process at the time of a read access in the information processor provided with the device emulation support apparatus according to the first embodiment of the invention.

FIG. 7 is a flow chart showing an exemplary emulation process at the time of a read access in the information processor provided with the device emulation support apparatus according to the first embodiment of the invention. FIG. 7 shows the emulation of the read access.

The CPU 1 executes the guest program and executes the read access for reading data from an address area of the peripheral device to be emulated, i.e. a virtual control register (Step S21).

Subsequently, the device emulation support apparatus 5 traps the access content of the read access by detecting the generation of this read access and stores the trapped access content in the access storing section 12 (Step S22). Subsequently, the device emulation support apparatus 5 causes the CPU 1 to generate an exception (Step S23). The processing of Step S22 corresponds to the aforementioned processings of Steps S1 to S5 of FIG. 2 and the processing of Step S23 corresponds to the aforementioned processings of Steps S6 and S7 of FIG. 2.

The exception generated here needs to have a property of transferring a control to the exception handler 23 and the exception controller 27 and invalidating the command that caused the generation of the access at a generation timing of the read access in Step S21. A data abort exception is frequently an exception having the above property. The device emulation support apparatus 5 causes the generation of an exception having the above property in the specification of the CPU 1.

Subsequently, the exception 23 or the exception controller 27 receives an instruction to execute the exception process from the CPU 1, judges that the generated exception is the one generated by the device emulation support apparatus 5 and calls the emulation program 24 (Step S24). An exemplary method for calling the emulation program 24 is already shown in the examples of the software configurations of FIGS. 4 to 6.

Subsequently, the CPU 1 executes the called emulation program 24 and obtains the trapped access content (Step S25). Specifically, the CPU 1 having executed the emulation program 24 obtains the access content including the address of the access destination from the control register of the access storing section 12.

Subsequently, the CPU 1 having executed the emulation program 24 performs the emulation process of the non-existent peripheral device using the obtained access content (Step S26). Since the CPU 1 having executed the emulation program 24 has already obtained the access content of the issued read access by executing the guest program, it emulates the process performed by the peripheral device using the obtained information (access content of the read access) and prepares read data to be read at the time of an access to the virtual control register.

Subsequently, the CPU 1 having executed the emulation program 24 sets the prepared read data to be read in the read data setting section 15 (Step S27). Then, the CPU 1 having executed the emulation program 24 ends the emulation process of the peripheral device. Subsequently, the exception hander 23 or the exception controller 27 returns to the guest program (Step S28). At this time, the CPU 1 returns to the command that caused the generation of the read access in Step S21 by re-executing the guest program.

Specifically, the CPU 1 performs the emulation process by generating an exception and then outputs the same access signal as the one output to the peripheral device 3 to the peripheral device 3 again in the case of receiving the exception generation notification output by the exception generating section 14.

Since returning to the same command, the CPU 1 having executed the guest program re-executes the read access for reading data from the address area of the peripheral device to be emulated, i.e. the virtual control register (Step S29). In other words, the read access in Step S29 is the same processing as the read access in Step S21.

Subsequently, the device emulation support apparatus 5 traps the access content of the read access by detecting the generation of this read access and deletes the last access content stored in Step S22 from the access storing section 12 (Step S30). In other words, since the trapped access content is the same as the access content of the last access stored in Step S22, no exception is generated. The processing of Step S30 corresponds to the aforementioned processings of Steps S1 to S5 and S8 of FIG. 2.

Subsequently, the device emulation support apparatus 5 outputs the read data set in Step S27 to the bus 4 (Step S31). The processing of Step S31 corresponds to the processing of Step S10 of FIG. 2.

Finally, the CPU 1 having executed the guest program receives the read data output to the bus 4 as a result of the read access and completes the read access for reading the data from the address area of the peripheral device to be emulated (Step S32).

By the above, according to the device emulation support apparatus of the first embodiment, the software for emulation can reduce processings relating to the access to the virtual register such as the analysis of the trapped command and the acquirement of the content of the command. In other words, in the conventional technology, the command that caused the generation of the exception needs to be analyzed in Step S25 of FIG. 7 if the emulation of the virtual register is performed by the software. A processing of specifying the storing destination of data to be read and a processing of storing data in the specified storing destination are at least performed as this analyzing processing.

On the other hand, in the first embodiment, the emulation of the peripheral device is realized by the writing of data in the read data setting section 15 in Step S27 and the overhead of re-executing the command in Step S29. Further, in the case of a command which automatically increments or decrements the read destination address, it is not particularly necessary to increment or decrement the read destination address in the emulation since the command is re-executed.

Figure 8:
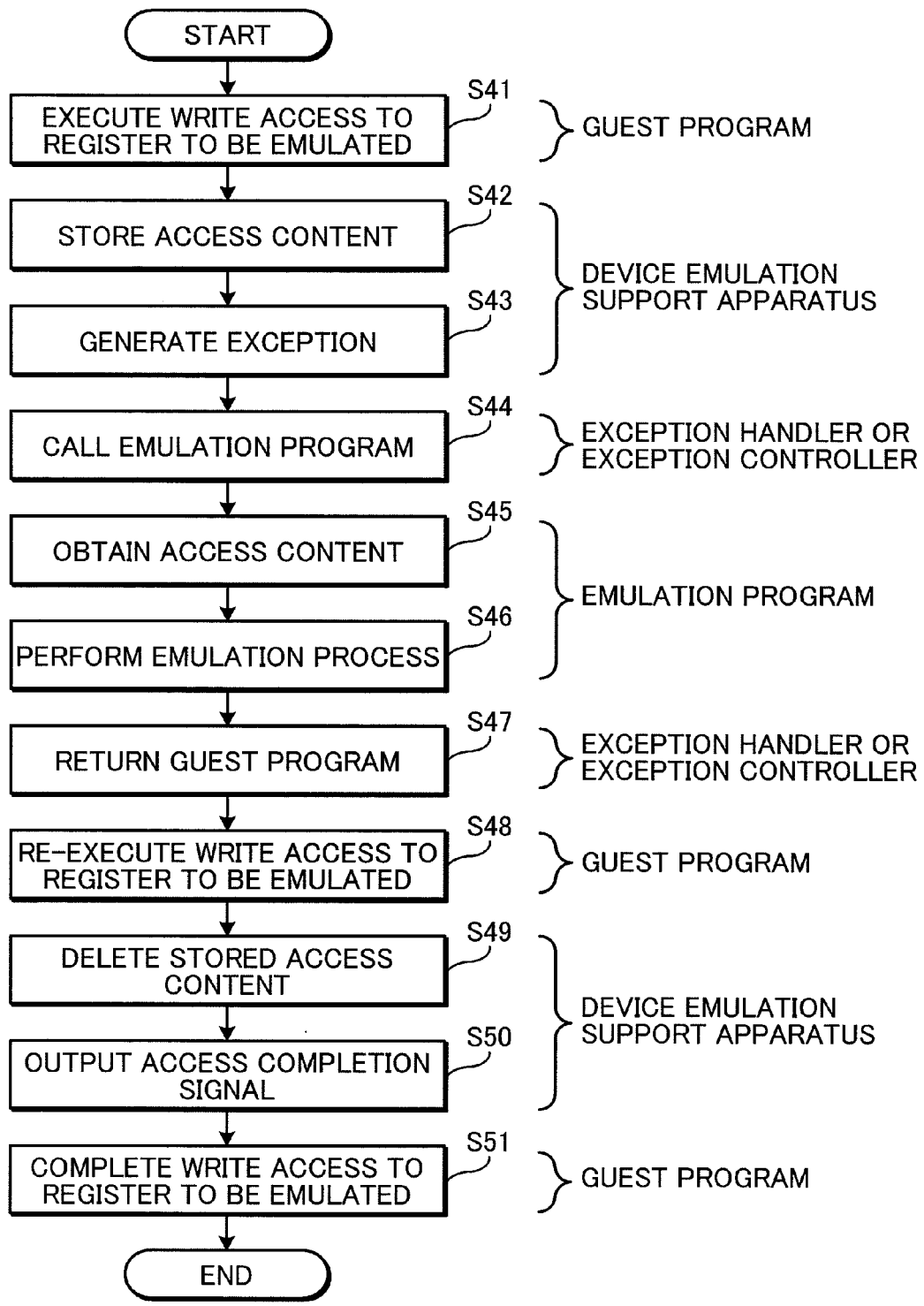
FIG. 8 is a flow chart showing an exemplary emulation process at the time of a write access in the information processor provided with the device emulation support apparatus according to the first embodiment of the invention.

FIG. 8 is a flow chart showing an exemplary emulation process at the time of a write access in the information processor provided with the device emulation support apparatus according to the first embodiment of the invention. FIG. 8 shows the emulation of the write access.

The CPU 1 executes the guest program and executes the write access for writing data in the address area of the peripheral device to be emulated, i.e. the virtual control register (Step S41).

Subsequently, at the time of the read access, the device emulation support apparatus 5 traps the access content of the write access by detecting the generation of this write access and stores the trapped access content in the access storing section 12 (Step S42). Subsequently, the device emulation support apparatus 5 causes the CPU 1 to generate an exception (Step S43). The processing of Step S42 corresponds to the aforementioned processing of Steps S1 to S5 of FIG. 2 and the processing of Step S43 corresponds to the aforementioned processings of Steps S6 and S7 of FIG. 2.

Subsequently, the exception handler 23 or the exception controller 27 receives an instruction to execute an exception process from the CPU 1, judges that the generated exception is the one generated by the device emulation support apparatus 5 and calls the emulation program 24 (Step S44).

Subsequently, the CPU 1 executes the called emulation program 24 and obtains the access content of the trapped access (Step S45). Specifically, the CPU 1 having executed the emulation program 24 obtains the access content including the address of the access destination and the written data from the control register of the access storing section 12.

Subsequently, the CPU 1 having executed the emulation program 24 performs the emulation process of the non-existent peripheral device using the obtained access content (Step S46). Since the CPU 1 having executed the emulation program 24 has already obtained the access content of the issued write access by executing the guest program, it emulates the processing performed by the peripheral device using the obtained information (access content of the write access). This processing of Step S46 is a processing of starting the process of the peripheral device when the peripheral device to be emulated operates concurrently with the CPU. In other words, in the case of emulating a DMA, the processing of Step S46 is a processing of starting data copy.

Subsequently, the CPU 1 having executed the emulation program 24 ends the emulation process of the peripheral device. Subsequently, the exception hander 23 or the exception controller 27 returns to the guest program (Step S47). At this time, the CPU 1 returns to the command that caused the generation of the write access in Step S41 by re-executing the guest program.

Since returning to the same command, the CPU 1 having executed the guest program executes the write access for writing data in the address area of the peripheral device to be emulated, i.e. the virtual control register again (Step S48).

Subsequently, the device emulation support apparatus 5 traps the access content of the write access by detecting the generation of this write access and deletes the last access content stored in Step S42 from the access storing section 12 (Step S49). In other words, since the trapped access content is the same as the access content of the last access stored in Step S42, no exception is generated. The processing of Step S49 corresponds to the aforementioned processings of Steps S1 to S5 and S8 of FIG. 2.

Subsequently, the device emulation support apparatus 5 outputs an access completion signal indicating the completion of the access to the bus 4 and ignores the write access (Step S50). The processing of Step S50 corresponds to the aforementioned processing of Step S12 of FIG. 2.

Finally, the CPU 1 having executed the guest program receives the access completion signal output to the bus 4 and completes the write access for writing the data in the address area of the peripheral device to be emulated (Step S51).

By the above, according to the device emulation support apparatus of the first embodiment, the software for emulation can reduce processings relating to the access to the virtual register such as the analysis of the trapped command and the acquirement of the content of the command. In other words, as at the time of the read access, the software for emulation needs to perform a processing of analyzing the command, a processing of specifying the storing destination of data to be written and a processing of incrementing or decrementing the register in the conventional technology.

On the other hand, in the first embodiment, the emulation of the peripheral device is realized by the reading of the data from the access storing section 12 and re-executing the command.

As described above, according to the first embodiment, the peripheral device can be efficiently emulated by the software for emulation reducing the processings relating to the access to the virtual registers such as the analysis of the trapped command and the acquirement of the content of the command. The processings deletable here include the analysis of the command by the software for obtaining the access content, the storage of the result at the time of reading by the software and the acquirement of the data at the time of writing.

(Second Embodiment)

Figure 9:
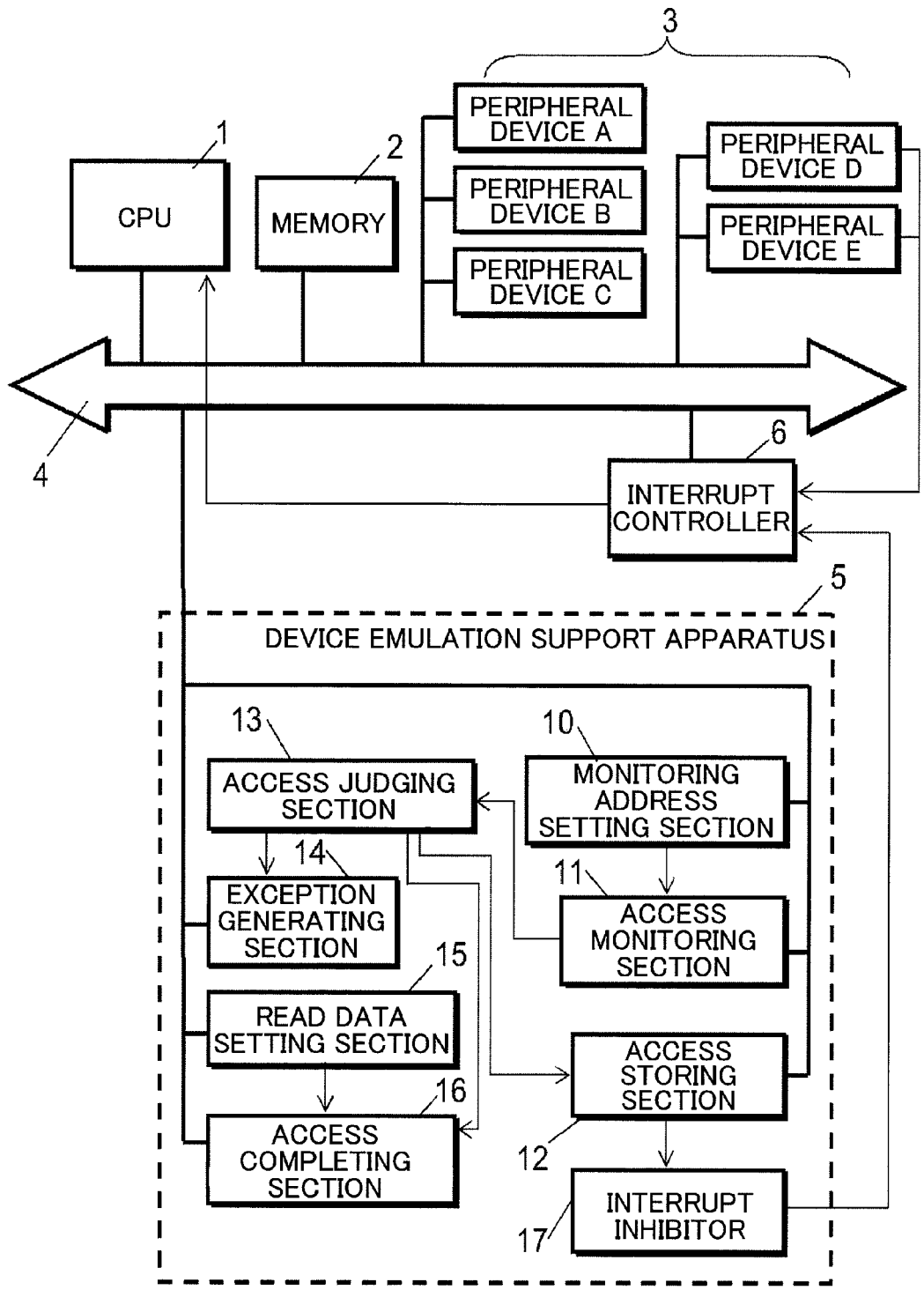
FIG. 9 is a diagram showing the construction of an information processor provided with a device emulation support apparatus according to a second embodiment of the invention.

FIG. 9 is a diagram showing the construction of an information processor provided with a device emulation support apparatus according to a second embodiment of the invention. The information processor is provided with a CPU 1, a memory 2, peripheral devices 3, a bus 4, a device emulation support apparatus 5 and an interrupt controller 6.

The CPU 1, the memory 2 and the bus 4 have the same functions as the constituent elements of FIG. 1. The peripheral devices 3 include those controlled using interrupts. In the second embodiment, the peripheral device D and the peripheral device E are peripheral devices controlled using interrupts.

The interrupt controller 6 is directly connected to the peripheral devices D, E controlled using interrupts out of the peripheral devices 3 via a circuit different form the bus 4. The interrupt controller 6 causes the CPU 1 to execute an interrupt process by generating an interrupt signal to the CPU 1.

The device emulation support apparatus 5 of the second embodiment includes a monitoring address setting section 10, an access monitoring section 11, an access storing section 12, an access judging section 13, an exception generating section 14, a read data setting section 15, an access completing section 16 and an interrupt inhibitor 17. The monitoring address setting section 10, the access monitoring section 11, the access storing section 12, the access judging section 13, the exception generating section 14, the read data setting section 15 and the access completing section 16 have the same functions as the constituent elements of the first embodiment, and the interrupt inhibitor 17 is an new additional constituent element. The following description is centered on the interrupt inhibitor 17 as the new constituent element.

An interrupt may be generated during the execution of the emulation process of the peripheral device, i.e. during the processings of Steps S24 to S28 of FIG. 7 or the processings of Steps S44 to S47 of FIG. 8. When an emulation program 24 or an exception hander 23 is executed, an interrupt inhibited state is set for the CPU 1 or an interrupt is masked by operating the interrupt controller 6. Thus, control complexity is reduced. In this case, except in the case where a guest program is already in the interrupt inhibited state or the interrupt masked state, the interrupt inhibited state or the interrupt masked state needs to be canceled in Step S28 of FIG. 7 or Step 47 of FIG. 8 in which return to the guest program is made.

If an interrupt is generated during a period of inhibiting the interrupt or masking the interrupt, the interrupt is suspended. Immediately after the interrupt inhibited state or the interrupt masked state is canceled, i.e. immediately after the return of the guest program, the CPU 1 senses an interrupt signal and executes an interrupt handler. In other words, a transition is made to an interrupt hander execution process before the re-execution of the command in the processing of Step S29 of FIG. 7 or the processing of Step S48 of FIG. 8. Here, if a command for generating an access with the same access content as the last access stored in the access storing section 12 is present in the interrupt handler to be executed, this access (interrupt) may be possibly judged to be caused by the re-execution of the command.

Accordingly, the interrupt inhibitor 17 of the second embodiment inhibits an interrupt signal until the re-execution of the command is completed, i.e. during the processing of Step S32 of FIG. 7 or the processing of Step S51 of FIG. 8. In this way, the above problem is solved. The interrupt inhibitor 17 corresponds to an example of an interrupt inhibitor in the second embodiment.

The interrupt inhibitor 17 is directly connected to the interrupt controller 6 via a circuit different from the bus 4 and has a function of inhibiting an interrupt signal to the CPU 1. Even if the interrupt controller 6 does not have a function of inhibiting an interrupt signal, the interrupt inhibitor 17 may be connected at an intermediate position of a wire for transmitting the interrupt signal, for example, as shown in FIG. 10.

Figure 10:
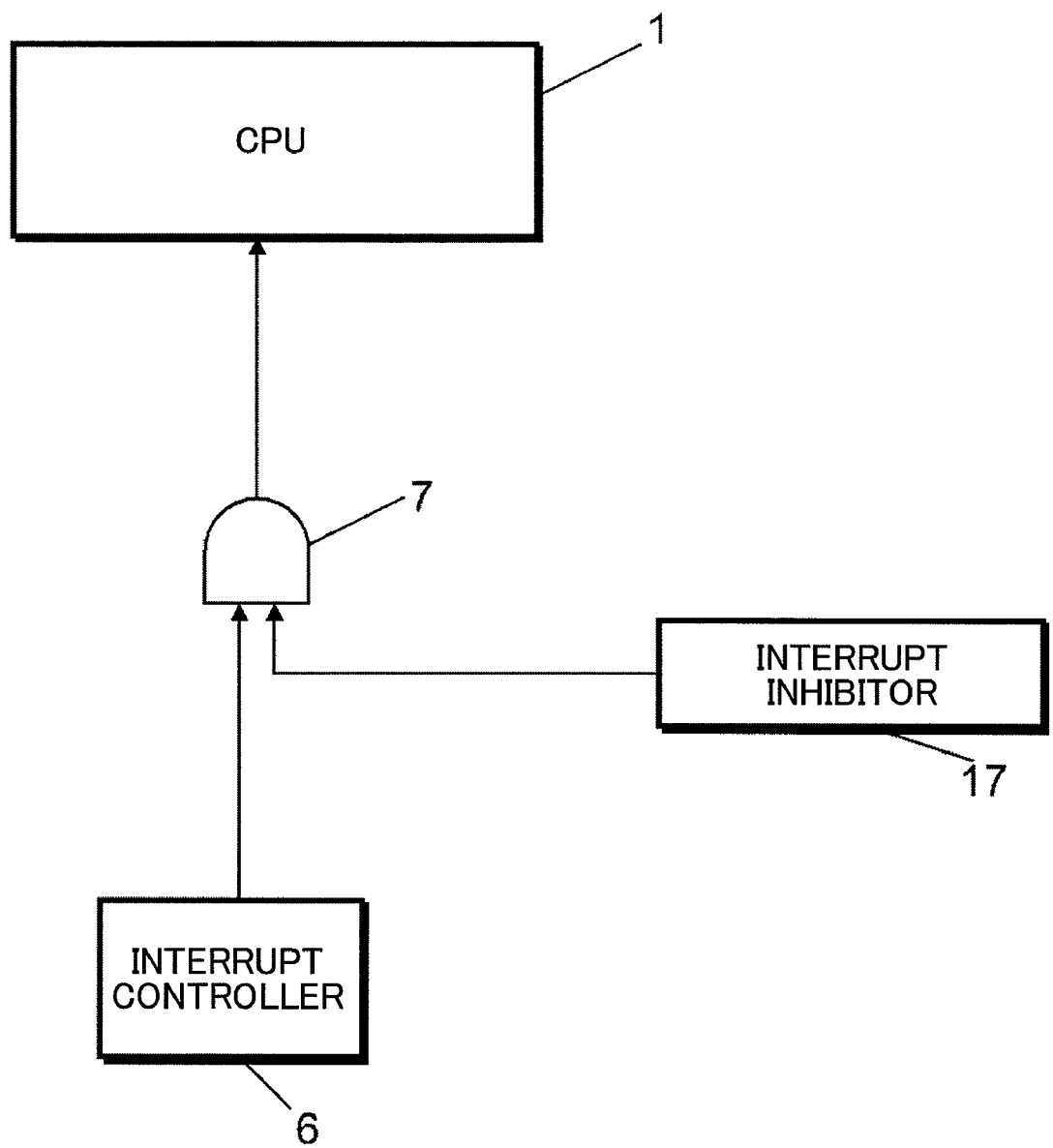
FIG. 10 is a diagram showing a connection example of an interrupt inhibitor and an interrupt controller in the second embodiment of the invention.

FIG. 10 is a diagram showing a connection example of the interrupt inhibitor and the interrupt controller in the second embodiment of the present invention. If signals output from the interrupt inhibitor 17 and the interrupt controller 6 are level signals, it is possible to realize a function of inhibiting an interrupt signal, for example, by providing a simple AND circuit 7 as shown in FIG. 10. By such a construction, no interrupt is generated since the interrupt signal to the CPU 1 is off regardless of whether or not any interrupt is suspended in the interrupt controller 6 when the interrupt inhibition or the interrupt masking is canceled.

The interrupt inhibition may be started by the operation of, for example, a control register provided in the interrupt inhibitor 17. In this case, the interrupt inhibition is started by the execution of the emulation program. Alternatively, the interrupt inhibitor 17 may receive a notification from the access monitoring section 11 at a trapping timing of an access (Step S21 of FIG. 7 or Step S41 of FIG. 8) and start the interrupt inhibition.

Further, the interrupt inhibitor 17 cancels the interrupt inhibition by receiving a notification from the CPU 1 when the access content stored in the access storing section 12 is deleted. In this way, the interrupt inhibition is canceled when the re-execution of the command is completed. If any interrupt is suspended, the CPU 1 detects an interrupt signal and executes the interrupt process after the re-execution of the command is completed.

As described above, in the second embodiment, it is possible to provide the interrupt handler with the same access as the one to the control register of the non-existent peripheral device by the guest program. Thus, the peripheral device controlled using an interrupt can be handled as the peripheral device to be emulated.

(Third Embodiment)

Figure 11:
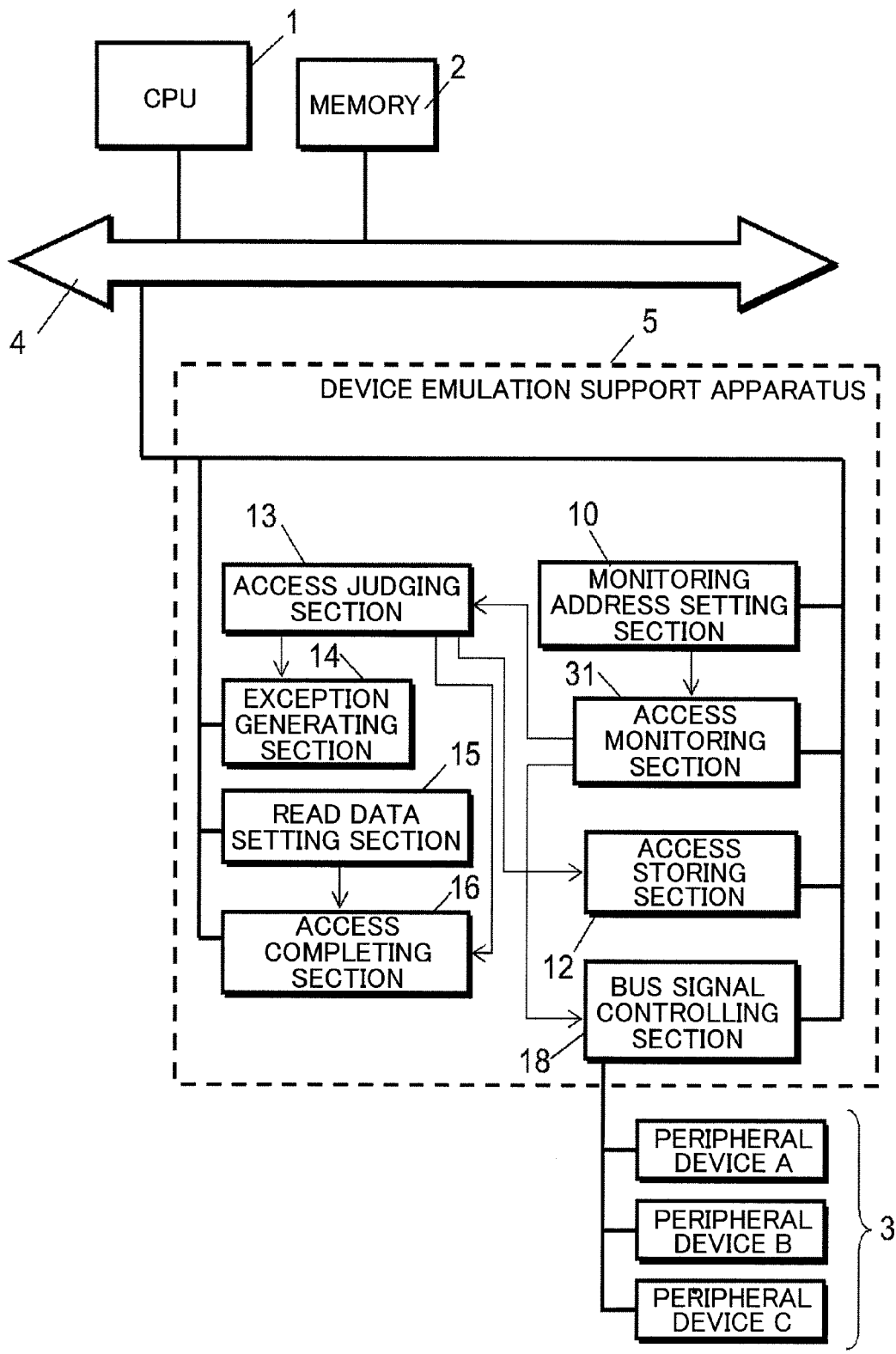
FIG. 11 is a diagram showing the construction of an information processor provided with a device emulation support apparatus according to a third embodiment of the invention.

FIG. 11 is a diagram showing the construction of an information processor provided with a device emulation support apparatus according to a third embodiment of the invention. The information processor is provided with a CPU 1, a memory 2, peripheral devices 3, a bus 4 and a device emulation support apparatus 5.

In the third embodiment, the peripheral devices 3 are directly connected to the device emulation support apparatus 5 and are connected to the CPU 1 via the device emulation support apparatus 5. In other words, the device emulation support apparatus 5 is arranged between the CPU 1 and the peripheral devices 3. The CPU 1, the memory 2 and the bus 4 have the same functions as the constituent elements of FIG. 1. The peripheral devices 3 are also connected to the bus 4 via the device emulation support apparatus 5.

The device emulation support apparatus 5 of the third embodiment includes a monitoring address setting section 10, an access monitoring section 31, an access storing section 12, an access judging section 13, an exception generating section 14, a read data setting section 15, an access completing section 16 and a bus signal controlling section 18. The monitoring address setting section 10, the access storing section 12, the access judging section 13, the exception generating section 14, the read data setting section 15 and the access completing section 16 have the same functions as the constituent elements of the first embodiment, and the access monitoring section 31 and the bus signal controlling section 18 differ from the first embodiment. The following description is centered on the access monitoring section 31 and the bus signal controlling section 18.

In the third embodiment, a signal output from the CPU 1 to the bus 4 is first transmitted to the device emulation support apparatus 5, but not to the peripheral devices 3.

The access monitoring section 31 monitors signals flowing on the bus 4 and detects the generation of an access conforming to conditions including an address range set in the monitoring address setting section 10. Each of these signals includes information on access content such as an address to be accessed, an access type indicating whether the access is a read access or a write access and the size of data to be read or written. Thus, the access monitoring section 31 can detect an access to an address space by the CPU 1 by monitoring signals flowing on the bus 4. Further, the access monitoring section 31 notifies the detected access content conforming to the conditions to the access judging section 13. Furthermore, the access monitoring section 31 notifies the access content at variance with the conditions to the bus signal controlling section 18.

Specifically, the access monitoring section 31 monitors accesses to the peripheral devices 3 from the CPU 1 and outputs the access content including the address conforming to the address stored in the monitoring address setting section 10 to the access storing section 12 and the access judging section 13 based on access signals output to the peripheral devices 3 from the CPU 1. Further, the access monitoring section 31 notifies the access content including the address at variance with the address stored in the monitoring address setting section 10 to the bus signal controlling section 18.

The bus signal controlling section 18 receives the access signal output to the peripheral device 3 from the CPU 1 and judges whether or not to output the received access signal to the peripheral device 3. The bus signal controlling section 18 outputs the access signal including the access content to the peripheral device 3 if this access content is notified from the access monitoring section 31. The bus signal controlling section 18 operates upon receiving the notification on the access content from the access monitoring section 31 and transmits the signal from the CPU 1 to the peripheral device 3 only when the access was not trapped. In other words, if the access was trapped by the device emulation support apparatus 5, no access is made to the peripheral device 3 from the CPU 1. Accordingly, if the address of a control register of a nonexistent virtual peripheral device overlaps with that of the actually existent peripheral device, the bus signal controlling section 18 does not notify the signal from the CPU 1 to the peripheral device 3. Thus, the peripheral device 3 does not respond to the CPU 1.

In the third embodiment, the peripheral device can be emulated by the above construction even if the control register of the virtual peripheral device and that of the control register of the existent peripheral device 3 are the same.

In the third embodiment, the device emulation support apparatus 5 may further include the interrupt inhibitor 17 of the second embodiment.

(Fourth Embodiment)

Figure 12:
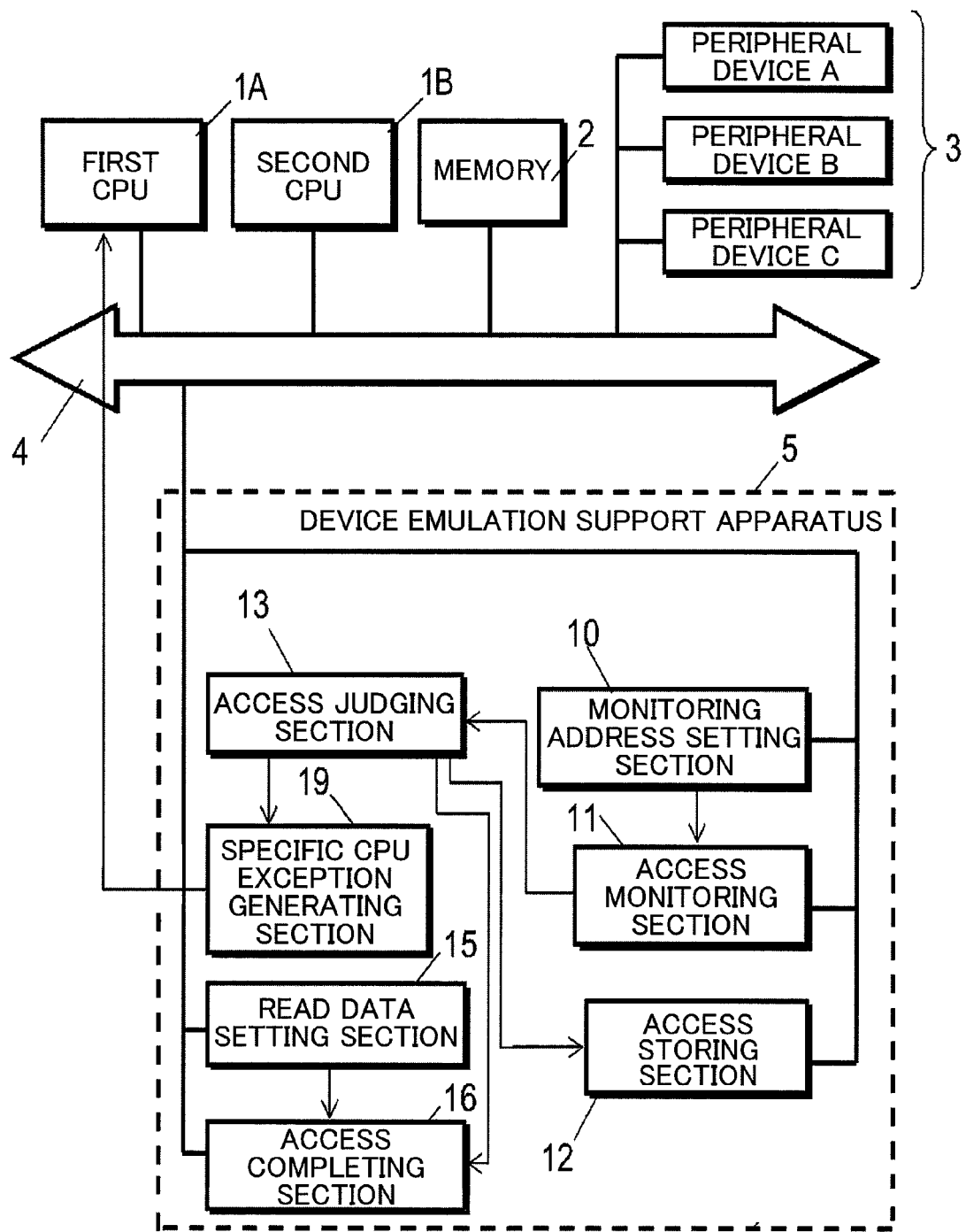
FIG. 12 is a diagram showing the construction of an information processor provided with a device emulation support apparatus according to a fourth embodiment of the invention.

FIG. 12 is a diagram showing the construction of an information processor provided with a device emulation support apparatus according to a fourth embodiment of the invention. The information processor is provided with a first CPU 1A, a second CPU 1B, a memory 2, peripheral devices 3, a bus 4 and a device emulation support apparatus 5. The memory 2, the peripheral devices 3 and the bus 4 have the same functions as the constituent elements of FIG. 1.

The information processor of the fourth embodiment is provided with two CPUs and the device emulation support apparatus 5 causes only in a specific CPU, e.g. the first CPU 1A to generate an exception.

The device emulation support apparatus 5 of the fourth embodiment includes a monitoring address setting section 10, an access monitoring section 11, an access storing section 12, an access judging section 13, a read data setting section 15, an access completing section 16 and a specific CPU exception generating section 19. The monitoring address setting section 10, the access monitoring section 11, the access storing section 12, the access judging section 13, the read data setting section 15 and the access completing section 16 have the same functions as the constituent elements of the first embodiment. The device emulation support apparatus 5 of the fourth embodiment includes the specific CPU exception generating section 19 instead of the exception generating section 14 of the first embodiment. The following description is centered on the specific CPU exception generating section 19 as a new constituent element.

The specific CPU exception generating section 19 is directly connected to the first CPU 1A as the specific CPU via a circuit different from the bus 4 and has a function of notifying an exception by generating a signal. The specific CPU exception generating section 19 receives an exception generation request from the access judging section 13 and causes the first CPU 1A to generate an exception when access content this time is judged to be different form the last access content by the access judging section 13. Specifically, the specific CPU exception generating section 19 is directly connected to an exception-related terminal of the first CPU 1A and outputs an exception notification to the first CPU 1A for the generation of an exception. The first CPU 1A can operate an emulation program upon the generation of this exception. The specific CPU exception generating section 19 transmits an exception notification only to the predetermined specific CPU out of a plurality of CPUs.

In the fourth embodiment, the specific CPU exception generating section 19 corresponds to an example of the exception generating section.

Figure 13:
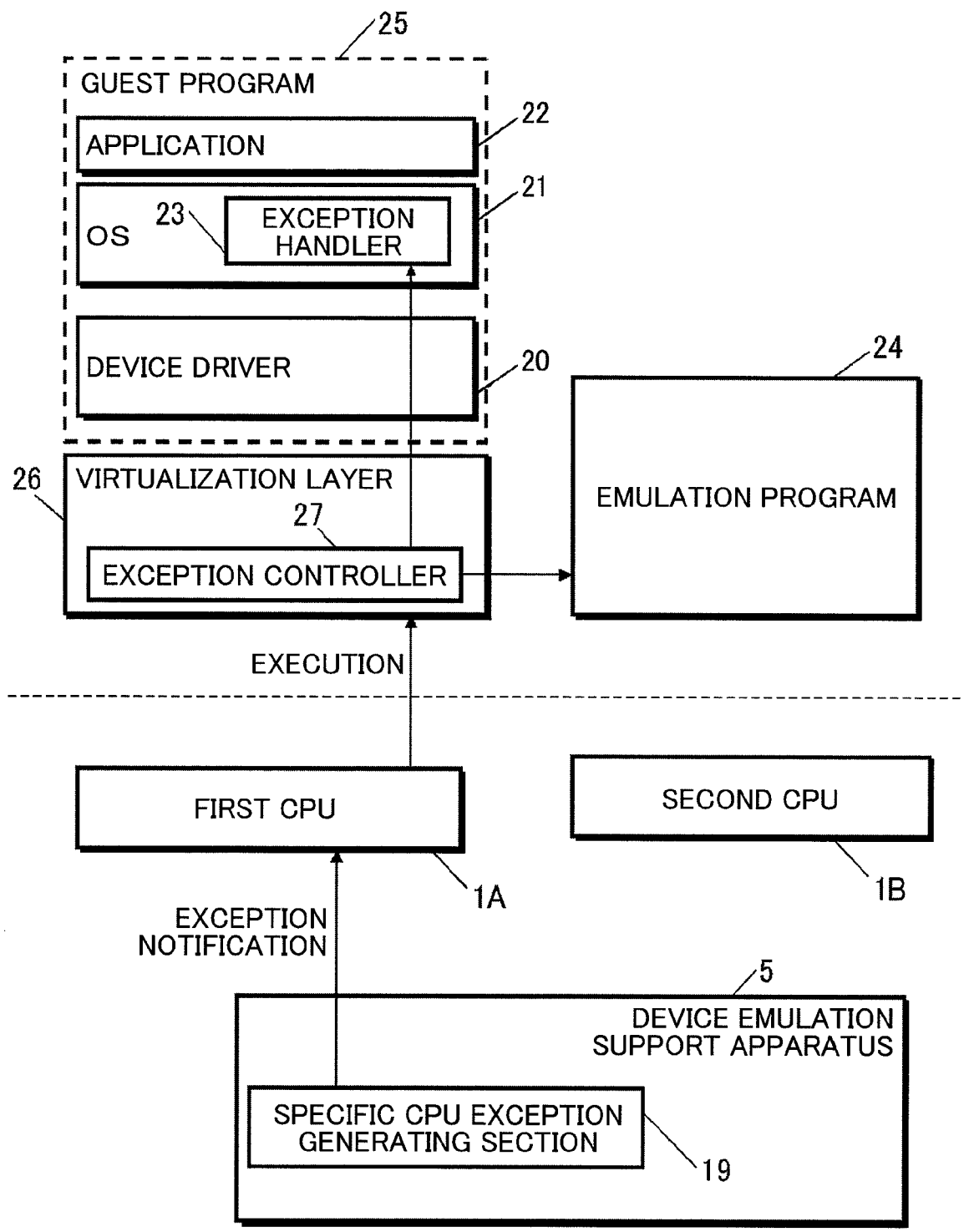
FIG. 13 is a diagram showing an exemplary software construction of the information processor provided with the device emulation support apparatus according to the fourth embodiment of the invention.

FIG. 13 is a diagram showing an exemplary software construction of the information processor provided with the device emulation support apparatus according to the fourth embodiment.

In FIG. 13, it is assumed that the information processor does not include a peripheral device corresponding to a device driver 20 and that the device driver 20, an OS 21 and an application 22 are a guest program 25. Further, the first CPU 1A for generating an exception executes the guest programs 25 and a virtualization layer 26 including an exception controller 27. On the other hand, the second CPU 1B executes an emulation program 24.

When the application 22 operating on the information processor generates an access to the peripheral device controlled by the device driver 20, the device emulation support apparatus 5 causes the first CPU 1A to generate an exception by outputting an exception notification to the first CPU 1A. The first CPU 1A instructs the execution of an exception process to the exception controller 27 of the virtualization layer 26 upon receiving the exception notification. The virtualization layer 26 first operates the exception controller 27 upon receiving the instruction to execute the exception process from the first CPU 1A.

The exception controller 27 judges whether or not the generated exception was generated by the device emulation support apparatus 5. In the case of the exception generated by the device emulation support apparatus 5, the first CPU 1A notifies to the emulation program 24 on the second CPU 1B using a general communication function between CPUs. The second CPU 1B executes an emulation process of the peripheral device. If the generated exception is not the one generated by the device emulation support apparatus 5, a control is transferred to an exception handler 23 in the OS 21. In this way, the emulation program 24 operates when the device driver 20 in the guest program 25 accesses to the peripheral device.

Although the virtualization layer 26 receives the instruction to execute the exception process and executes the emulation program 24 in FIG. 13, the OS 21 may receive the instruction to execute the exception process and execute the emulation program 24.

Further, the emulation program 24 may be divided into two and the first CPU 1A may execute an emulation process part relating to the reading and writing of data from and in a control register. In this case, the first CPU 1A is constructed as shown in FIG. 4 or 5. The second CPU 1B executes a data process part of the peripheral device concurrently operating with the first CPU 1A such as a data transfer process by a DMA, an encoding process and a decoding process.

Figure 14:
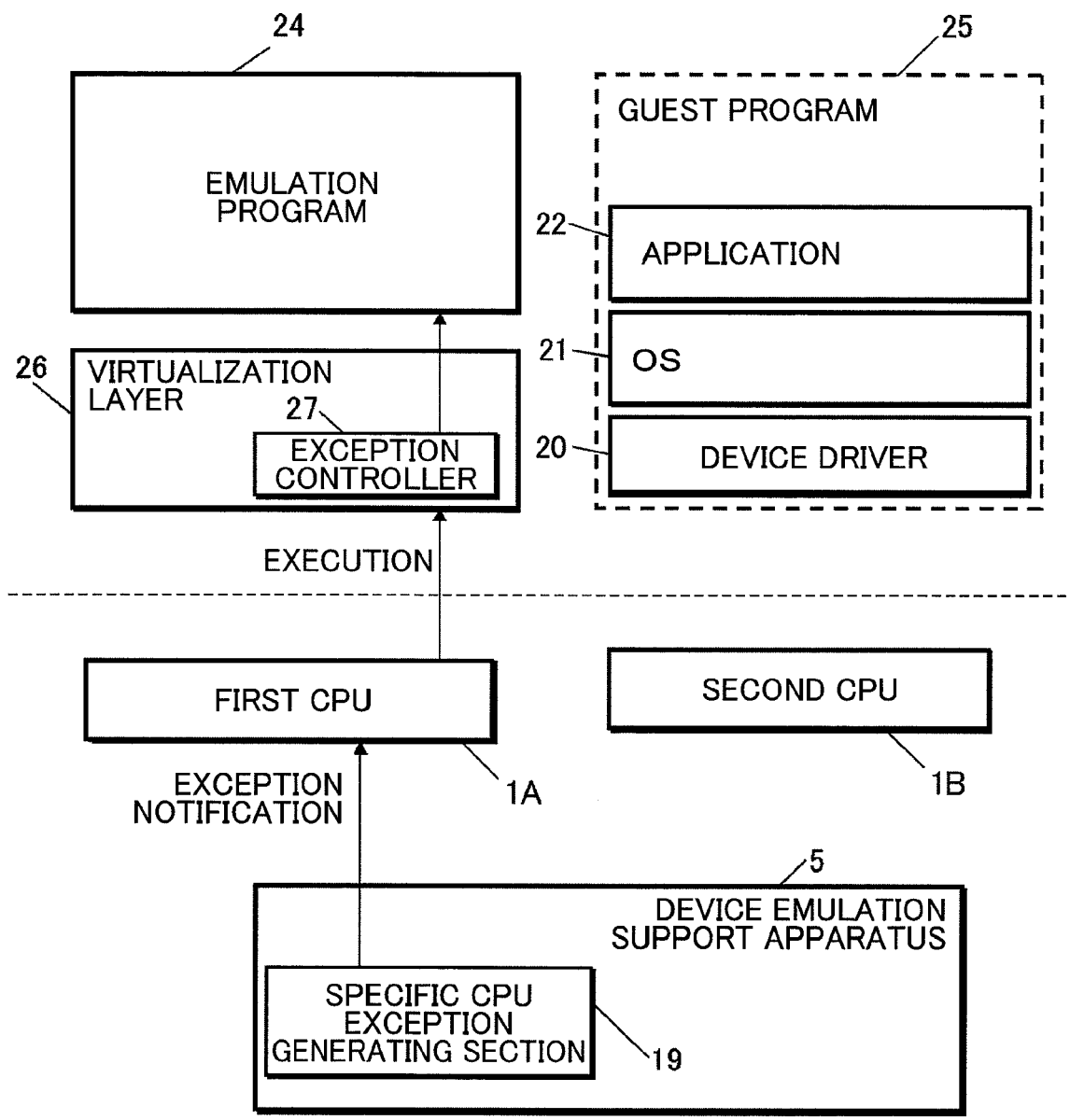
FIG. 14 is a diagram showing a modification of the software construction of the information processor provided with the device emulation support apparatus according to the fourth embodiment of the invention.

FIG. 14 is a diagram showing a modification of the software construction of the information processor provided with the device emulation support apparatus according to the fourth embodiment.

In FIG. 14, the first CPU 1A executes the emulation program 24 and the virtualization layer 26 including the exception controller 27. On the other hand, the second CPU 1B executes the guest program 25 including the device driver 20, the OS 21 and the application 22.

In FIG. 14, the guest program 25 is executed by the second CPU 1B, to which no exception notification from the device emulation support apparatus 5 is input. When an exception is generated by the device emulation support apparatus 5, the emulation program 24 is executed by the first CPU 1A.

Although the virtualization layer 26 receives the instruction to execute the exception process and executes the emulation program 24 in FIG. 14, the first CPU 1A may also include an OS and the OS of the first CPU 1A may receive the instruction to execute the exception process and execute the emulation program 24. Further, the emulation program 24 may be directly stored in an exception handler of the OS of the first CPU 1A.

As described above, according to the fourth embodiment, the software for emulation can emulate the peripheral device without needing to perform processings relating to the access to the virtual control register such as the maintenance of compatibility relating to the execution of the command such as the analysis of the trapped command and the incrementing or decrementing of the register. Thus, throughput in the emulation can be reduced and the efficiency of the emulation of the peripheral device can be improved.

Although the single CPU 1 is provided in the first, second and third embodiments, the present invention is not limited to this. The device emulation support apparatus of the first, second or third embodiment can be also used in an information processor for processing using a plurality of CPUs in the control of an OS or the like. In the fourth embodiment as well, each of the first CPU 1A and the second CPU 1B may be comprised of a plurality of CPUs.

Although the device emulation support apparatuses of the first to fourth embodiments can be realized as LSIs which are integrated circuits, they may be each individually formed into one chip or so formed into one chip as to partly or entirely include the device emulation support apparatus. The LSIs mentioned here may be also called ICs, system LSIs, super LSIs or ultra LSIs depending on their integration degrees. The integration technique may be realized by dedicated circuits or general-purpose processors without being limited to LSIs. An FPGA (Field Programmable Gate Array) programmable after the production of an LSI or a reconfigurable processor capable of reconfiguring the connection and setting of circuit cells in an LSI may also be utilized. Further, if integration technology as an alternative to LSIs should appear with the progress in semiconductor technology or another derivative technology, a functional block may be integrated using this technology. The adaptation of biotechnology and the like can be possible.

(Fifth Embodiment)

Figure 15:
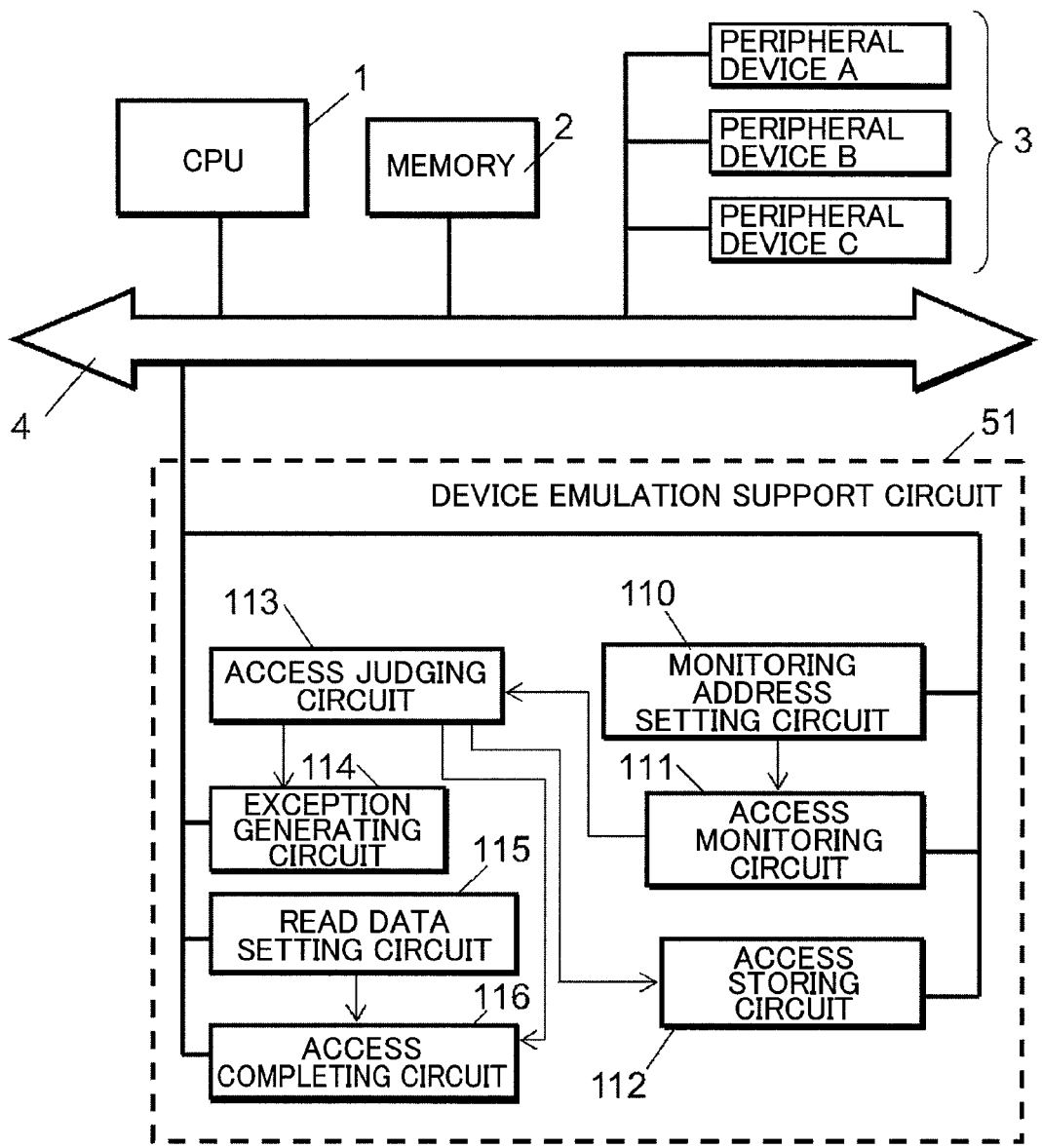
FIG. 15 is a diagram showing the construction of an information processor provided with a device emulation support apparatus according to a fifth embodiment of the invention.

FIG. 15 is a diagram showing the construction of an information processor provided with a device emulation support apparatus according to a fifth embodiment of the invention. The information processor shown in FIG. 15 is provided with a CPU 1, a memory 2, peripheral devices 3 and a device emulation support circuit 51.

The device emulation support circuit 51 is an integrated circuit and includes a monitoring address setting circuit 110, an access monitoring circuit 111, an access storing circuit 112, an access judging circuit 113, an exception generating circuit 114, a read data setting circuit 115 and an access completing circuit 116. In the information processor of the fifth embodiment shown in FIG. 15, the same construction as in the first embodiment is identified by the same reference numerals and not described.

The monitoring address setting circuit 110, the access monitoring circuit 111, the access storing circuit 112, the access judging circuit 113, the exception generating circuit 114, the read data setting circuit 115 and the access completing circuit 116 of the fifth embodiment have the same functions as the monitoring address setting section 10, the access monitoring section 11, the access storing section 12, the access judging section 13, the exception generating section 14, the read data setting section 15 and the access completing section 16 of the first embodiment.

In this way, the monitoring address setting circuit 110, the access monitoring circuit 111, the access storing circuit 112, the access judging circuit 113, the exception generating circuit 114, the read data setting circuit 115 and the access completing circuit 116 can be mounted on one integrated circuit.

The specific embodiments described above mainly embrace inventions having the following constructions.

A device emulation support apparatus according to one aspect of the present invention is the one communicably connected to a CPU via a bus and comprises a monitoring address storing section for storing an address corresponding to a peripheral device to be emulated as an address to be monitored; an access monitoring section for monitoring an access to the peripheral device from the CPU and obtaining access information including an address conforming to the address stored in the monitoring address storing section from an access signal including the access information with the address corresponding to the peripheral device to be accessed and output from the CPU to the peripheral device; an access storing section for storing the access information obtained by the access monitoring section; a read data storing section for temporarily storing data to be read from the peripheral device when the access is a read access indicating data reading; an exception generating section for transmitting an exception generation notification to the CPU to cause the CPU to generate an exception; an access judging section for receiving the access information obtained by the access monitoring section, comparing the received access information with the last access information stored in the access storing section and storing the obtained access information in the access storing section and requesting the generation of an exception to the exception generating section when the received access information is different from the last access information while excluding the last access information stored in the access storing section from access information to be compared when the received access information is the same as the last access information; and an access completing section for outputting the data stored in the read data storing section to the CPU and completing the access when the access monitored by the access monitoring section is the read access while completing the access when the access monitored by the access monitoring section is a write access indicating data writing.

A device emulation support method according to another aspect of the present invention comprises a monitoring address storing step of storing an address corresponding to a peripheral device to be emulated as an address to be monitored in a monitoring address storing section; an access monitoring step of monitoring an access to the peripheral device from the CPU and obtaining access information including an address conforming to the address stored in the monitoring address storing section from an access signal including the access information with the address corresponding to the peripheral device to be accessed and output from the CPU to the peripheral device in an access storing section; an access storing step of storing the access information obtained in the access monitoring step; a read data storing step of temporarily storing data to be read from the peripheral device in a read data storing section when the access is a read access indicating data reading; an access judging step of receiving the access information obtained in the access monitoring step and comparing the received access information with the last access information stored in the access storing section; an exception generating step of storing the obtained access information in the access storing section and transmitting an exception generation notification to the CPU to cause the CPU to generate an exception when the received access information is different from the last access information; an excluding step of excluding the last access information stored in the access storing section from access information to be compared when the received access information is the same as the last access information; and an access completing step of outputting the data stored in the read data storing section to the CPU and instructing the CPU to complete the read access when the access monitored in the access monitoring step is the read access while instructing the CPU to complete a write access indicating data writing when the access monitored in the access monitoring step is the write access.

A device emulation support circuit according to another aspect of the present invention is the one communicably connected via a bus with a CPU for performing an emulation process by generating an exception and comprises a monitoring address storing circuit for storing an address corresponding to a peripheral device to be emulated as an address to be monitored; an access monitoring circuit for monitoring an access to the peripheral device from the CPU and obtaining access information including an address conforming to the address stored in the monitoring address storing circuit from an access signal including the access information with the address corresponding to the peripheral device to be accessed and output from the CPU to the peripheral device; an access storing circuit for storing the access information obtained by the access monitoring circuit; a read data storing circuit for temporarily storing data to be read from the peripheral device when the access is a read access indicating data reading; an exception generating circuit for transmitting an exception generation notification to the CPU to cause the CPU to generate an exception; an access judging circuit for receiving the access information obtained by the access monitoring circuit, comparing the received access information with the last access information stored in the access storing circuit and storing the obtained access information in the access storing circuit and requesting the exception generating circuit to transmit the exception generation notification to the CPU when the received access information is different from the last access information while excluding the last access information stored in the access storing circuit from access information to be compared when the received access information is the same as the last access information; and an access completing circuit for outputting the data stored in the read data storing circuit to the CPU and instructing the CPU to complete the read access when the access monitored by the access monitoring circuit is the read access while instructing the CPU to complete a write access indicating data writing when the access monitored by the access monitoring circuit is the write access.

An information processor according to another aspect of the present invention comprises a CPU; a peripheral device to be controlled by the CPU; a bus for transmitting an access signal output from the CPU to the peripheral device; and any of the above device emulation support apparatuses.

According to these constructions, the address corresponding to the peripheral device to be emulated is stored as the address to be monitored in the monitoring address storing section. The access to the peripheral device from the CPU is monitored, and the access information including the address conforming to the address stored in the monitoring address storing section is obtained from the access signal including the access information with the address corresponding to the peripheral device to be accessed and output from the CPU to the peripheral device. The obtained access information is stored in the access storing section. The data to be read from the peripheral device is temporarily stored in the read data storing section when the access is a read access indicating data reading. The obtained access information is received and the received access information and the last access information stored in the access storing section are compared. When the received access information is different from the last access information, the obtained access information is stored in the access storing section and the exception generation notification is transmitted to the CPU to cause the CPU to generate an exception. On the other hand, when the received access information is the same as the last access information, the last access information stored in the access storing section is excluded from the access information to be compared stored in the access storing section. When the access being monitored is the read access, the data stored in the read data storing section is output to the CPU and the CPU is instructed to complete the read access. Further, when the access being monitored is the write access indicating data writing, the CPU is instructed to complete the write access.

Specifically, when the received access information is different from the last access information stored in the access storing section, an emulation process is performed by causing the CPU to generate an exception. On the other hand, when the received access information is the same as the last access information stored in the access storing section, it is assumed as the re-execution of the access accompanying the completion of the exception. The CPU is instructed to complete the read access after specified data is output to the CPU when the access is the read access, whereas the CPU is instructed to directly complete the write access when the access is the write access.

Accordingly, a process of obtaining necessary data by analyzing the content of the trapped access is not performed by the CPU that performs emulation. Thus, throughput can be reduced at the time of emulation and the peripheral device can be efficiently emulated.

In the above device emulation support apparatus, it is preferable to further comprise an interrupt inhibitor for inhibiting an interrupt to the CPU while the last access information to be compared by the access judging section is stored in the access storing section.

According to this construction, the interrupt to the CPU is inhibited while the last access information to be compared is stored in the access storing section.

In other words, if an access having the same access information as the last access information stored in the access storing section is executed as an interrupt process during the emulation, it is assumed to be the re-execution of the access accompanying the completion of the exception.

Accordingly, the interrupt to the CPU is inhibited while the last access information to be compared is stored in the access storing section. Thus, the peripheral device to be controlled by the interrupt can be handled as the peripheral device to be emulated.

In the above device emulation support apparatus, it is preferable that a bus signal controlling section for receiving the access signal output from the CPU to the peripheral device and judging whether or not to output the received access signal to the peripheral device is further provided; that the access monitoring section notifies access information including an address at variance with the address stored in the monitoring address storing section to the bus signal controlling section; and that the bus signal controlling section outputs the access signal including the access information to the peripheral device if the access information is notified from the access monitoring section.

According to this construction, the bus signal controlling section receives the access signal output from the CPU to the peripheral device. Then, the access information including the address at variance with the address stored in the monitoring address storing section is notified to the bus signal controlling section. The bus signal controlling section outputs the access signal including the access information to the peripheral device when the access information is notified.

Accordingly, only the access signal sent from the CPU to the peripheral device not to be emulated is output to the peripheral device, wherefore it is possible to reliably perform the emulation and control the existent peripheral device even if the address of the peripheral device to be emulated and that of the existent peripheral device are the same.

In the above device emulation support apparatus, it is preferable that the CPU includes a plurality of CPUs; and that the exception generating section transmits the exception generation notification only to a specific CPU predetermined out of the plurality of CPUs.

According to this construction, since the exception generation notification is transmitted only to the specific CPU predetermined out of the plurality of CPUs, it is possible to perform the emulation in the specific CPU by generating an exception and, simultaneously, execute other program(s) in the other CPU(s).

In the above device emulation support apparatus, the access information preferably includes at least an address corresponding to the peripheral device to be accessed, an access type indicating whether the access is the read access or the write access, and a value to be written in the peripheral device when the access type is the write access.

According to this construction, the access to the peripheral device to be emulated from the CPU can be specified using the address included in the access information and whether the access is the read access or the write access can be specified using the access type included in the access information. Further, the value included in the access information can be written in the peripheral device when the access type is the write access.

In the above device emulation support apparatus, the CPU preferably executes the emulation process by generating an exception and then outputs the same access signal as the one output to the peripheral device to the peripheral device again when receiving the exception generation notification output by the exception generating section.

According to this construction, the CPU performs the emulation process by generating an exception and then outputs the same access signal as the one output to the peripheral device to the peripheral device again when receiving the exception generation notification.

Thus, the emulation process is performed by outputting the first access signal and data corresponding to the read access is transferred to the CPU and the access is completed by outputting the same access signal as the first access signal again. Therefore, the emulation process can be performed without the CPU accessing the peripheral device.

The specific embodiments or examples described as modes for embodying the invention are merely to illustrate the technical contents of the present invention and the present invention should not be narrowly interpreted by being limited to such specific examples and various changes can be made within the spirit of the present invention and the scope as claimed below.

Industrial Applicability

The device emulation support apparatus, the device emulation support method, the device emulation support circuit and the information processor according to the present invention are applicable not only to, for example, large-scale computers or personal computers, but also to various household electric appliances, communication devices such as mobile phones, industrial equipments or vehicles.

What is claimed is:

1. A device emulation support apparatus communicably connected via a bus to a Central Processing Unit (CPU) for performing an emulation process by generating an exception, comprising:
    a hardware monitoring address storing section for storing an address corresponding to a peripheral device to be emulated as an address to be monitored;
    an access monitoring section for monitoring an access to the peripheral device from the CPU and obtaining access information including an address conforming to the address stored in the monitoring address storing section from an access signal including the access information with the address corresponding to the peripheral device to be accessed and output from the CPU to the peripheral device;
    an access storing section for storing the access information obtained by the access monitoring section;
    a read data storing section for temporarily storing data to be read from the peripheral device when the access is a read access indicating data reading;
    an exception generating section for transmitting an exception generation notification to the CPU to cause the CPU to generate an exception;
    an access judging section for receiving the access information obtained by the access monitoring section, comparing the received access information with last access information stored in the access storing section, storing the received access information in the access storing section, and requesting the exception generating section to transmit the exception generation notification to the CPU, when the received access information is different from the last access information while excluding the last access information stored in the access storing section from being further compared when the received access information is the same as the last access information; and
    an access completing section for outputting the data stored in the read data storing section to the CPU and instructing the CPU to complete the read access when the access monitored by the access monitoring section is the read access while instructing the CPU to complete a write access indicating data writing when the access monitored by the access monitoring section is the write access.

2. A device emulation support apparatus according to claim 1, further comprising an interrupt inhibitor for inhibiting an interrupt to the CPU while the last access information to be compared by the access judging section is stored in the access storing section.

3. A device emulation support apparatus according to claim 1, further comprising a bus signal controlling section for receiving the access signal output from the CPU to the peripheral device and judging whether or not to output the received access signal to the peripheral device, wherein:

the access monitoring section notifies access information including an address at variance with the address stored in the monitoring address storing section to the bus signal controlling section; and the bus signal controlling section outputs the access signal including the access information to the peripheral device if the access information is notified from the access monitoring section.

4. A device emulation support apparatus according to claim 1, wherein:

the CPU includes a plurality of CPUs; and the exception generating section transmits the exception generation notification only to a specific CPU predetermined out of the plurality of CPUs.

5. A device emulation support apparatus according to claim 1, wherein the access information includes at least an address corresponding to the peripheral device to be accessed, an access type indicating whether the access is the read access or the write access; and a value to be written in the peripheral device when the access type is the write access.

6. A device emulation support apparatus according to claim 1, wherein the CPU executes the emulation process by generating an exception and then outputs the same access signal as the one output to the peripheral device to the peripheral device again when receiving the exception generation notification output by the exception generating section.

7. A device emulation support method, comprising:

a monitoring address storing step of storing an address corresponding to a peripheral device to be emulated as an address to be monitored in a monitoring address storing section;

an access monitoring step of monitoring an access to the peripheral device from a Central Processing Unit (CPU) and obtaining access information including an address conforming to the address stored in the monitoring address storing section from an access signal including the access information with the address corresponding to the peripheral device to be accessed and output from the CPU to the peripheral device;

an access storing step of storing the access information obtained in the access monitoring step in an access storing section;

a read data storing step of temporarily storing data to be read from the peripheral device in a read data storing section when the access is a read access indicating data reading;

an access judging step of receiving the access information obtained in the access monitoring step and comparing the received access information with last access information stored in the access storing section;

an exception generating step of storing the received access information in the access storing section and transmitting an exception generation notification to the CPU to cause the CPU to generate an exception, when the received access information is different from the last access information;

an excluding step of excluding the last access information stored in the access storing section from being further compared when the received access information is the same as the last access information; and an access completing step of outputting the data stored in the read data storing section to the CPU and instructing the CPU to complete the read access when the access monitored in the access monitoring step is the read access while instructing the CPU to complete a write access indicating data writing when the access monitored in the access monitoring step is the write access.

8. A device emulation support integrated circuit communicably connected via a bus with a Central Processing Unit (CPU) for performing an emulation process by generating an exception, comprising:

a monitoring address storing circuit for storing an address corresponding to a peripheral device to be emulated as an address to be monitored;

an access monitoring circuit for monitoring an access to the peripheral device from the CPU and obtaining access information including an address conforming to the address stored in the monitoring address storing circuit from an access signal including the access information with the address corresponding to the peripheral device to be accessed and output from the CPU to the peripheral device;

an access storing circuit for storing the access information obtained by the access monitoring circuit;

a read data storing circuit for temporarily storing data to be read from the peripheral device when the access is a read access indicating data reading;

an exception generating circuit for transmitting an exception generation notification to the CPU to cause the CPU to generate an exception;

an access judging circuit for receiving the access information obtained by the access monitoring circuit, comparing the received access information with last access information stored in the access storing circuit, storing the received access information in the access storing circuit, and requesting the exception generating circuit to transmit the exception generation notification to the CPU, when the received access information is different from the last access information while excluding the last access information stored in the access storing circuit from being further compared when the received access information is the same as the last access information; and an access completing circuit for outputting the data stored in the read data storing circuit to the CPU and instructing the CPU to complete the read access when the access monitored by the access monitoring circuit is the read access while instructing the CPU to complete a write access indicating data writing when the access monitored by the access monitoring circuit is the write access.

9. An information processor, comprising:

a Central Processing Unit (CPU);

a peripheral device to be controlled by the CPU;

a bus for transmitting an access signal output from the CPU to the peripheral device; and a device emulation support apparatus communicably connected via the bus to the CPU for performing an emulation process by generating an exception, wherein the device emulation support apparatus comprises:

a hardware monitoring address storing section for storing an address corresponding to the peripheral device to be emulated as an address to be monitored;

an access monitoring section for monitoring an access to the peripheral device from the CPU and obtaining access information including an address conforming to the address stored in the monitoring address storing section from the access signal including the access information with the address corresponding to the peripheral device to be accessed and output from the CPU to the peripheral device;

an access storing section for storing the access information obtained by the access monitoring section;

a read data storing section for temporarily storing data to be read from the peripheral device when the access is a read access indicating data reading;

an exception generating section for transmitting an exception generation notification to the CPU to cause the CPU to generate an exception;

an access judging section for receiving the access information obtained by the access monitoring section, comparing the received access information with last access information stored in the access storing section, storing the received access information in the access storing section, and requesting the exception generating section to transmit the exception generation notification to the CPU, when the received access information is different from the last access information while excluding the last access information stored in the access storing section from being further compared when the received access information is the same as the last access information; and an access completing section for outputting the data stored in the read data storing section to the CPU and instructing the CPU to complete the read access when the access monitored by the access monitoring section is the read access while instructing the CPU to complete a write access indicating data writing when the access monitored by the access monitoring section is the write access.

* * * * *